US010222203B2

(12) United States Patent
Yamamoto

(10) Patent No.: US 10,222,203 B2
(45) Date of Patent: Mar. 5, 2019

(54) MEASUREMENT APPARATUS AND METHOD THAT MEASURE SHAPE OF SURFACE WHILE CANCELING CYCLICAL ERRORS TO ZERO BY SUMMING OF CYCLIC ERRORS HAVING DIFFERENT PHASES

(71) Applicant: CANON KABUSHIKI KAISHA, Tokyo (JP)

(72) Inventor: Takahiro Yamamoto, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 197 days.

(21) Appl. No.: 14/823,209

(22) Filed: Aug. 11, 2015

(65) Prior Publication Data

US 2016/0054117 A1   Feb. 25, 2016

(30) Foreign Application Priority Data

Aug. 20, 2014 (JP) .................................. 2014-167960
May 25, 2015 (JP) .................................. 2015-105818

(51) Int. Cl.
*G01B 9/02* (2006.01)
*G01B 11/24* (2006.01)
(Continued)

(52) U.S. Cl.
CPC .......... *G01B 11/2441* (2013.01); *G01B 5/004* (2013.01); *G01B 9/02021* (2013.01); *G01B 9/02059* (2013.01); *G01B 11/002* (2013.01)

(58) Field of Classification Search
CPC ............... G02B 9/02059; G01B 5/004; G01B 9/02059; G01B 5/016; G01B 5/012; G01B 5/008; G01B 5/20
See application file for complete search history.

(56) References Cited

U.S. PATENT DOCUMENTS 6,252,668 B1   6/2001 Hill
6,421,130 B1   7/2002 Phillion
(Continued)

FOREIGN PATENT DOCUMENTS

EP    2466249 A1    6/2012
JP    2001317933 A  11/2001
(Continued)

OTHER PUBLICATIONS

McRae et al. "Linearization and Minimization of Cyclic Error with Heterodyne Laser Interferometry", Optics Letters, Optical Society of America, US, vol. 37, No. 13, Jul. 1, 2012, pp. 2448-2450, XP001576804. Cited in EPSR issued in counterpart application No. EP15002337.2, dated Jan. 27, 2016.
(Continued)

*Primary Examiner* — Hwa Lee
(74) *Attorney, Agent, or Firm* — Rossi, Kimms & McDowell LLP

(57) ABSTRACT

The present invention provides a measurement apparatus for measuring a shape of a test surface, comprising an optical system configured to irradiate a measurement point on the test surface and a reference surface with light, and cause test light and reference light reflected to interfere with each other, a detector configured to detect an optical path length difference between the test light and the reference light by using interfering light and a processor configured to determine a position of the measurement point based on a plurality of detection results by the detector, wherein a detection result includes an error which cyclically changes, and the plurality of detection results include n detection results obtained in n states in which optical path lengths of the test light are different from each other by 1/n (n≥2) of a cycle of the error.

18 Claims, 15 Drawing Sheets

(51) Int. Cl.
   *G01B 5/004*   (2006.01)
   *G01B 11/00*   (2006.01)

(56) References Cited

U.S. PATENT DOCUMENTS

| | | |
|---|---|---|
| 2005/0046869 A1 | 3/2005 | Kawasaki et al. |
| 2012/0158359 A1 | 6/2012 | Nakajima |
| 2012/0204435 A1 | 8/2012 | Nakajima |
| 2013/0094028 A1 | 4/2013 | Rembe et al. |
| 2013/0197844 A1 | 8/2013 | Oota |

FOREIGN PATENT DOCUMENTS

| | | |
|---|---|---|
| JP | 2006078354 A | 3/2006 |
| JP | 2006343249 A | 12/2006 |
| JP | 2012237686 A | 12/2012 |

OTHER PUBLICATIONS

Tiziani "Heterodyne Interferometry Using Two Wavelengths for Dimensional Measurements", SPIE Laser Interferometry IV: Computer-Aided Interferometry, vol. 1553, Jul. 1, 1991, pp. 490-501, XP002752463. Cited in EPSR issued in counterpart application No. EP15002337.2, dated Jan. 27, 2016.

European Search Report issued in counterpart application No. EP15002337.2, dated Jan. 27, 2016.

Extended European Search Report issued in European Appln. No. 15002337.2 dated Jun. 14, 2016.

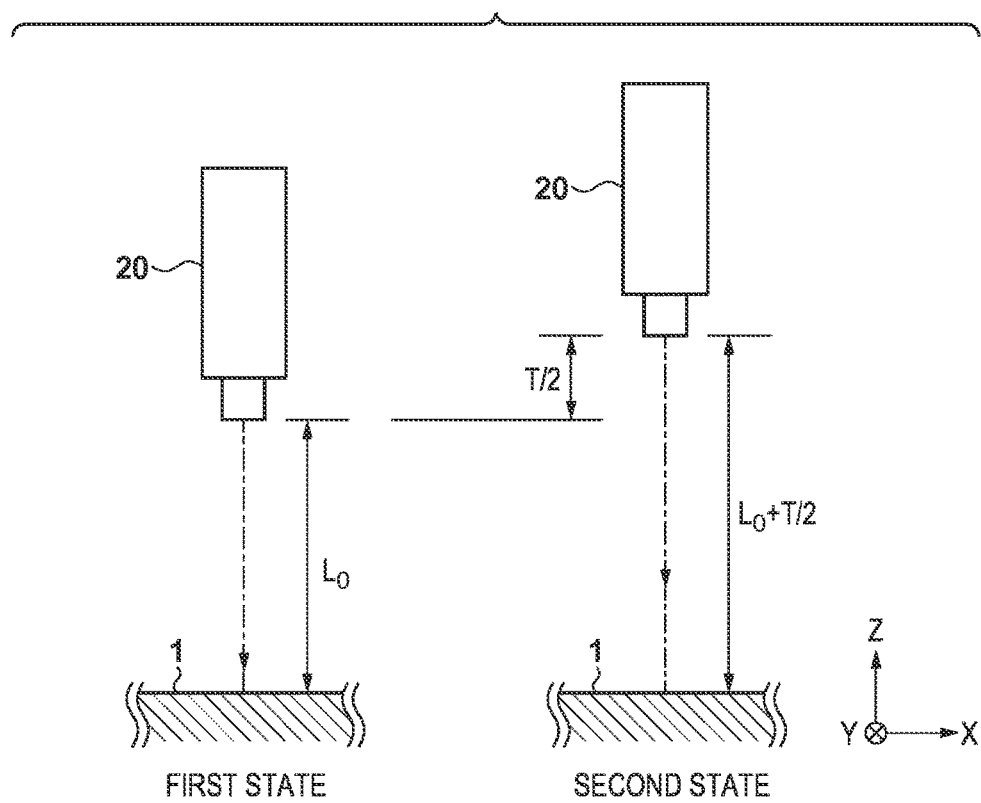

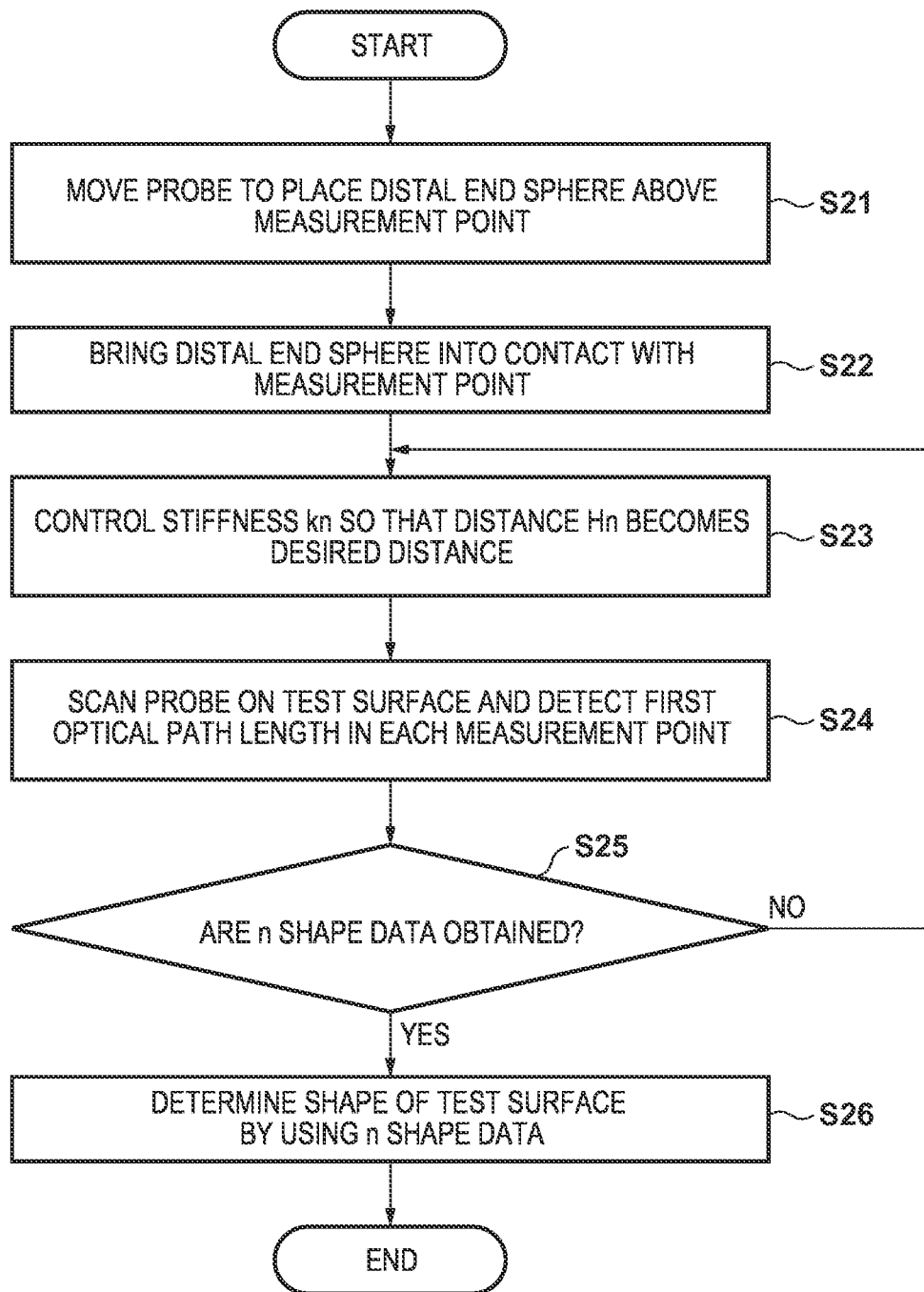

MEASUREMENT APPARATUS AND METHOD THAT MEASURE SHAPE OF SURFACE WHILE CANCELING CYCLICAL ERRORS TO ZERO BY SUMMING OF CYCLIC ERRORS HAVING DIFFERENT PHASES

BACKGROUND OF THE INVENTION

Field of the Invention

The present invention relates to a measurement apparatus and measurement method for measuring the shape of a test surface, and a method of manufacturing an article.

Description of the Related Art

A measurement apparatus (interferometer) which measures the shape of a test surface based on an interference signal generated by interference between test light reflected by the test surface and reference light reflected by a reference surface is known. In this measurement apparatus, a cyclic nonlinear error (so-called cyclic error) can occur in measurement results due to stray light generated by, for example, unintended reflection by an optical element included in the apparatus. U.S. Pat. No. 6,252,668 has proposed a method of reducing cyclic errors based on a Doppler shift obtained by changing an optical path length difference between the test light and reference light at a defined rate.

In this method described in U.S. Pat. No. 6,252,668, the optical path length difference between the test light and reference light must be changed at a defined rate (for example, 1.2 nm/sec for a double pulse interferometer) in order to obtain the Doppler shift to be used to reduce cyclic errors. Therefore, a mechanism for changing the optical path length difference at the defined rate is indispensable.

SUMMARY OF THE INVENTION

The present invention provides a technique advantageous in accurately measuring the shape of a test surface.

According to one aspect of the present invention, there is provided a measurement apparatus for measuring a shape of a test surface, comprising: an optical system configured to irradiate a measurement point on the test surface and a reference surface with light, and cause test light reflected by the measurement point and reference light reflected by the reference surface to interfere with each other; a detector configured to detect an optical path length difference between the test light and the reference light by using interfering light of the test light and the reference light; and a processor configured to determine a position of the measurement point based on a plurality of detection results by the detector; wherein a detection result among the plurality of detection results includes an error which cyclically changes in accordance with a change of the optical path length difference, and the plurality of detection results include n detection results obtained by causing the detector to detect the optical path length differences in n states in which optical path lengths of the test light are different from each other by 1/n (n≥2) of a cycle of the error.

Further features of the present invention will become apparent from the following description of exemplary embodiments with reference to the attached drawings.

BRIEF DESCRIPTION OF THE DRAWINGS

FIG. 3 is a view for explaining a method of determining the position of a measurement point on a test surface;

FIG. 12 is a flowchart showing a measurement operation of a measurement apparatus of the seventh embodiment;

DESCRIPTION OF THE EMBODIMENTS

Figure 1:
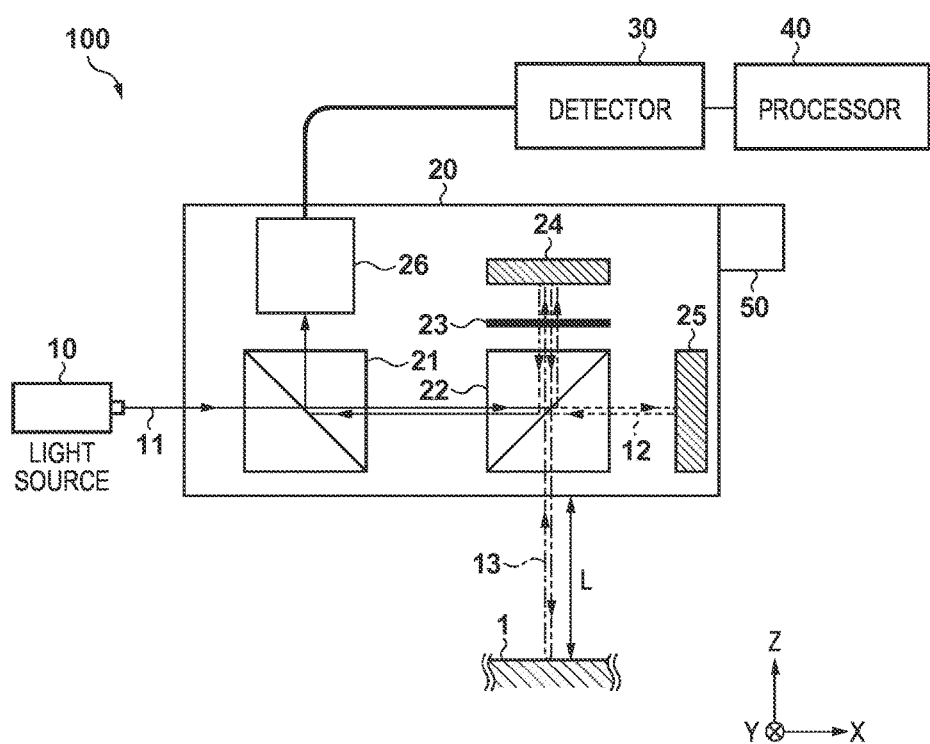
FIG. 1 is a schematic view showing a measurement apparatus of the first embodiment.

Exemplary embodiments of the present invention will be described below with reference to the accompanying drawings. Note that the same reference numerals denote the same members throughout the drawings, and a repetitive description thereof will not be given.

First Embodiment

A measurement apparatus 100 of the first embodiment according to the present invention will be explained with reference to FIG. 1. FIG. 1 is a schematic view of the measurement apparatus 100 of the first embodiment. The measurement apparatus 100 irradiates a measurement point on the surface (to be referred to as a test surface 1 hereinafter) of a test object and a reference surface 25 with light, and determines the position (height) of the measurement point based on an interference signal generated by test light reflected by the measurement point on the test surface and reference light reflected by the reference surface 25. Then, the measurement apparatus 100 can measure the shape of the test surface 1 by determining the positions of a plurality of measurement points on the test surface. The measurement apparatus 100 is formed as a heterodyne interferometer. For example, the measurement apparatus 100 can include a light source 10 for emitting light, an optical system 20 which receives the test light and reference light and generates interfering light, a detector 30 for detecting an optical path length difference between the test light and reference light, and a processor 40 for determining the position of each measurement point on the test surface. The first embodiment will be explained by assuming that the processor 40 controls each unit of the measurement apparatus 100. However, the present invention is not limited to this, and a controller for controlling each unit may also be provided in the measurement apparatus 100 in addition to the processor 40. Also, the measurement apparatus 100 of the first embodiment includes the detector 30 and processor 40 as separate constituent elements, but may also include them as one constituent element. For example, the measurement apparatus 100 may also be so configured that the processor 40 includes the detector 30.

The light source 10 includes a semiconductor laser or solid-state laser, and emits light. The light source 10 of the first embodiment includes, for example, an He—Ne laser, and emits a laser beam 11 having a wavelength $\lambda$ ($\lambda$=633 nm). The laser beam 11 emitted from the light source 10 is incident on the optical system 20. The optical system 20 can include, for example, a beam splitter 21, a polarizing beam splitter 22, a $\lambda$/4 plate 23, a mirror 24, the reference surface 25, and a light-receiving unit 26. The beam splitter 21 splits the laser beam 11 incident on the optical system 20 at a predetermined ratio (for example, 5:5 or 3:7) regardless of the polarization state of the laser beam 11. The polarizing beam splitter 22 splits the laser beam 11 transmitted through the beam splitter 21 into light containing a P polarization component and light containing an S polarization component. One of the light containing the P polarization component and the light containing the S polarization component is incident on the reference surface 25 through the polarizing beam splitter 22. Light reflected by the reference surface 25 is incident on the beam splitter 21 through the polarizing beam splitter 22. The light reflected by the reference surface 25 will be called reference light 12 hereinafter.

On the other hand, the other one of the light containing the P polarization component and the light containing the S polarization component is reflected by the polarizing beam splitter 22, incident on the $\lambda$/4 plate 23, and incident on the mirror 24 after the polarization direction is rotated 90°. The light reflected by the mirror 24 is incident on the $\lambda$/4 plate 23 again, and incident on the polarizing beam splitter 22 after the polarization direction is rotated 90°. The light transmitted through the $\lambda$/4 plate 23 twice and incident on the polarizing beam splitter 22 has a polarization direction rotated 180° with respect to the polarization direction of the light reflected by the polarizing beam splitter 22. Therefore, this light is transmitted through the polarizing beam splitter 22 and irradiates the test surface 1 (a measurement point). The light reflected by the test surface 1 is transmitted through the polarizing beam splitter 22, incident on the $\lambda$/4 plate 23, and incident on the mirror 24 after the polarization direction is rotated 90°. The light reflected by the mirror 24 is incident on the $\lambda$/4 plate 23 again, and incident on the polarizing beam splitter 22 after the polarization direction is rotated 90°. The light transmitted through the $\lambda$/4 plate 23 twice and incident on the polarizing beam splitter 22 has a polarization direction rotated 180° with respect to the polarization direction of the light transmitted through the polarizing beam splitter 22. Therefore, this light is reflected by the polarizing beam splitter 22, and incident on the beam splitter 21. The light reflected by the test surface 1 will be called test light 13 hereinafter.

The reference light 12 and test light 13 incident on and reflected by the beam splitter 21 are incident on the light-receiving unit 26. The light-receiving unit 26 includes a lens for collimating the reference light 12 and test light 13, and forms interfering light of the collimated reference light 12 and test light 13. The detector 30 converts the interfering light formed by the light-receiving unit 26 into an electrical signal, and detects an optical path length difference between the reference light 12 and test light 13 based on this electrical signal (interference signal). Accordingly, the processor 40 can determine the position (height) of the measurement point on the test surface based on the detection result obtained from the detector 30. Then, the processor 40 can obtain the shape of the test surface 1 by determining the positions of a plurality of measurement points on the test surface.

In the measurement apparatus 100 constructed as described above, stray light generated by unintended reflection by an optical element included in the measurement apparatus 100, for example, light reflected by the $\lambda$/4 plate 23 is sometimes incident on the light-receiving unit 26. In this case, a cyclic nonlinear error (so-called cyclic error) occurs in the detection result obtained by the detector 30, and this may make it difficult to accurately determine the position of a measurement point on a test surface. In the measurement apparatus 100 of the first embodiment, therefore, the detector 30 detects optical path length differences for one measurement point on a test surface in a plurality of states in which distances L between the optical system 20 and measurement point are different, thereby obtaining a plurality of detection results. Then, the measurement apparatus 100 determines the position (height) of the measurement point by canceling (reducing) cyclic errors contained in the plurality of obtained detection results. A method of determining the position of a measurement point on a test surface in the measurement apparatus 100 of the first embodiment will be explained below.

Figure 2A:
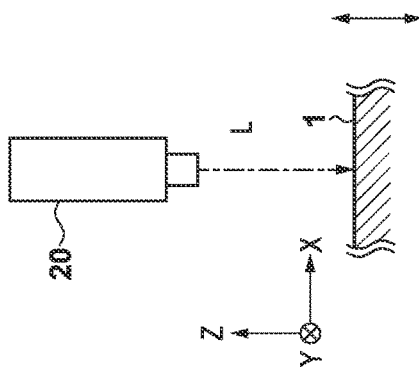
FIG. 2A is a view for explaining a method of extracting a cyclic error.
Figure 2B:
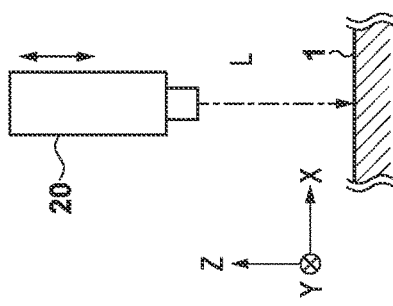
FIG. 2B is a view for explaining the method of extracting a cyclic error.

First, a method of extracting a cyclic error will be explained. As described above, a cyclic error occurs due to stray light inside the measurement apparatus 100, and cyclically changes in accordance with a change of optical path length difference between the reference light 12 and test light 13. As shown in FIGS. 2A and 2B, therefore, the processor 40 causes the detector 30 to detect the optical path length difference while changing the distance L between the optical system 20 and a measurement point on a test surface. For example, a changing unit 50 which changes the relative positions of the optical system 20 and test surface 1 may be provided in the measurement apparatus 100. In the first embodiment, an example in which the changing unit 50 includes a driver for driving the optical system 20 and the relative positions of the optical system 20 and test surface 1 are changed by driving the optical system 20 by the driver as shown in FIG. 2A will be explained. However, the present invention is not limited to this. For example, the changing unit 50 can include a stage for driving a test object, and the relative positions can be changed by driving the test object by the stage as shown in FIG. 2B. Furthermore, the changing unit 50 can include both the driver and stage, and the relative positions can be changed by relatively driving the optical system 20 and test object by the driver and stage.

Figure 2C:
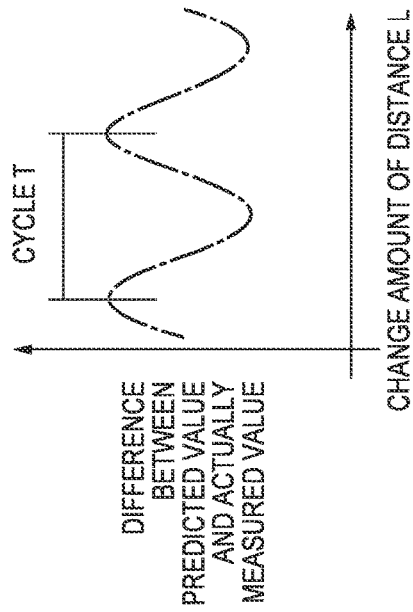
FIG. 2C is a view for explaining the method of extracting a cyclic error.
Figure 2D:
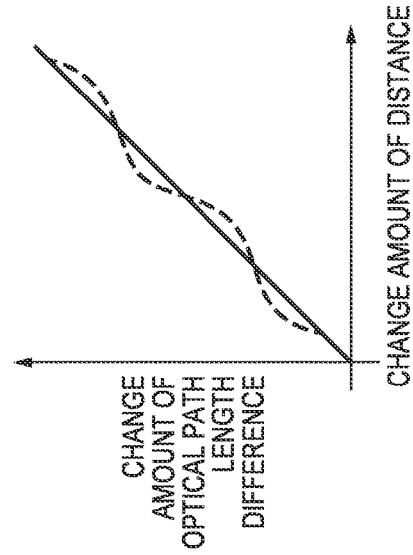
FIG. 2D is a view for explaining the method of extracting a cyclic error.

Consequently, as shown in FIG. 2C, the processor 40 can obtain the relationship between the change amount of the distance L and the change amount of the optical path length difference detected by the detector 30. Referring to FIG. 2C, the solid line indicates a predicted value of the change amount of the optical path length difference as a function of the change amount of the distance L, and the broken line indicates an actually measured value (a detection result obtained by the detector 30) of the change amount of the optical path length difference as a function of the change amount of the distance L. In the measurement apparatus shown in FIG. 1, the change amount of the optical path length difference and that of the distance L are equal. As indicated by the solid line in FIG. 2C, therefore, the change amount of the optical path length difference detected by the detector 30 presumably linearly changes with respect to the change amount of the distance L. In practice, however, as indicated by the broken line in FIG. 2C, the change amount of the optical path length difference detected by the detector 30 does not linearly change with respect to the change amount of the distance L. When a difference between the predicted value (solid line) and actually measured value (broken line) shown in FIG. 2C is obtained, a cyclic fluctuation component is obtained as shown in FIG. 2D. This cyclic fluctuation component is a cyclic error, and a cycle T of the cyclic error can be obtained by this fluctuation component. FIG. 2D shows a cyclic error having one type of cycle T for the sake of simplicity. In practice, however, a plurality of stray light components are generated because light is reflected by a plurality of optical elements, and cyclic errors having a plurality of types of cycles (T1, T2, . . . ) appear. The cyclic error has the features that i) the error has a predetermined cycle and ii) the error cyclically fluctuates in accordance with the change of distance L. Even when cyclic errors having a plurality of types of cycles appear, therefore, these cyclic errors can easily be separated into the individual cycles by performing the above-described steps. Also, the cycle T of the cyclic error depends on the wavelength $\lambda$ of the light emitted from the light source 10. Accordingly, it is also possible to determine the cycle T of the cyclic error from the wavelength $\lambda$ of the light emitted from the light source 10.

Next, a method of determining the position of a measurement point on a test surface will be explained. As described above, the cyclic error has a predetermined cycle, and the phase of the cyclic error shifts by $\pi$ when the distance L is changed by the half (T/2) of the cycle T as shown in FIG. 2D. Therefore, the processor 40 causes the detector 30 to detect an optical path length difference in each of two states in which the distances L between the optical system 20 and a measurement point on a test surface are different from each other by ½ of the cycle T of the cyclic error, thereby obtaining two detection results. The processor 40 then obtains the position of the measurement point based on the two obtained detection results. For example, as shown in FIG. 3, the processor 40 causes the detector 30 to detect an optical path length difference in each of first and second states in which the distances L between the optical system 20 and a measurement point on a test surface are different from each other by ½ of the cycle T. Letting "$L_0$" be the distance L in the first state, a detection result M1 in the first state and a detection result M2 in the second state are represented by equations (1) and have values containing cyclic errors (CE1 and CE2):

$$M1 = L_0 + CE1$$

$$M2 = (L_0 + T/2) + CE2 \quad (1)$$

Subsequently, the processor 40 can obtain the distance $L_0$ from the detection result M1 in the first state and the detection result M2 in the second state by performing calculations as indicated by equations (2). In this case, the phases of the cyclic errors CE1 and CE2 are different by $\pi$ as described above, and the total is zero, so the cyclic errors contained in the detection results are canceled. Accordingly, the processor 40 can accurately determine the position of the measurement point on the test surface. In the above explanation, the detector 30 detects an optical path length difference in each of two states in which the distances L are different from each other by ½ of the cycle T of the cyclic error, and the position of a measurement point is determined based on the two detection results obtained by that. However, the present invention is not limited to this. For example, it is also possible to cause the detector 30 to detect an optical path length difference in each of n states in which the distances L are different from each other by 1/n (n≥2) of the cycle T, and determine the position of a measurement point based on the n detection results obtained by that. The total of cyclic errors contained in the detection results are zero, so the cyclic errors contained in the detection results can be canceled, in this case as well. This makes it possible to accurately determine the position of a measurement point. Furthermore, the n states are not limited to a case in which the distances L are strictly different by 1/n (n≥2) of the cycle T. For example, the n states need only be set such that the distances L are different from each other by 1/n (n≥2) of the cycle T:

$$M1 + M2 = (2L_0 + T/2) + (CE1 + CE2)$$

$$CE1 + CE2 = 0$$

$$\therefore L_0 = \{(M1 + M2) - T/2\}/2 \quad (2)$$

In the measurement apparatus 100 of the first embodiment as described above, the detector 30 detects an optical path length difference for one measurement point on a test surface in each of two states in which the distances L are different from each other by ½ of the cycle T of a cyclic error, thereby obtaining two detection results. As a consequence, the measurement apparatus 100 can accurately determine the position of the measurement point by canceling cyclic errors contained in the detection results.

Second Embodiment

A measurement apparatus of the second embodiment according to the present invention will be explained. In the second embodiment, a method of measuring the shape of a test surface 1 by determining the positions of a plurality of measurement points on the test surface will be explained. For example, a processor 40 causes a detector 30 to detect an optical path length difference, for each measurement point on the test surface, in each of two states in which distances L between an optical system 20 and measurement point are different by ½ of a cycle T of a cyclic error. That is, the processor 40 causes the detector 30 to detect an optical path length difference, for one measurement point, in each of the two states in which the distances L are different by ½ of the cycle T, thereby obtaining a plurality of detection results. Accordingly, the processor 40 can accurately obtain the shape of the test surface 1 by determining the positions of the measurement points so as to cancel cyclic errors contained in the detection results.

An example of the method of obtaining a plurality of detection results for each measurement point on a test surface is a method of repeating the step of obtaining a plurality of detection results at one measurement point. In this method, the processor 40 causes the detector 30 to detect an optical path length difference, at a first measurement point on a test surface, in each of a plurality of states in which the distances L between the optical system 20 and first measurement point are different from each other by ½ of the cycle T of the cyclic error. Consequently, the processor 40 can obtain a plurality of detection results at the first measurement point. After obtaining the plurality of detection results at the first measurement point, the processor 40 causes a changing unit 50 to change the relative positions of the test surface 1 and optical system 20 in a direction (XY direction) perpendicular to the axis of light emitted from the optical system 20 to the test surface 1. Then, the processor 40 causes the detector 30 to detect an optical path length difference, at a second measurement point different from the first measurement point, in a plurality of states in which the distances between the optical system 20 and second measurement point are different from each other by ½ of the cycle T of the cyclic error. Consequently, the processor 40 can obtain a plurality of detection results at the second measurement point. By repeating these steps, the processor 40 can obtain a plurality of detection results at each measurement point on the test surface.

Figure 4:
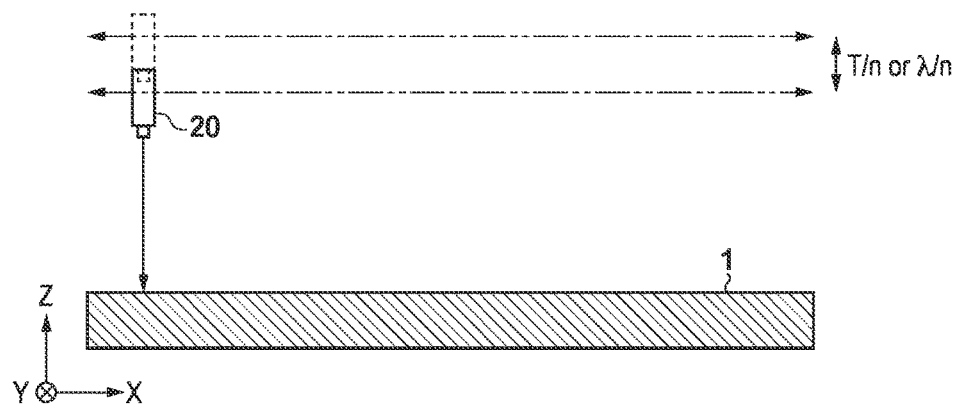
FIG. 4 is a view for explaining a method of obtaining a plurality of detection results at each measurement point on the test surface.

Another example of the method of obtaining a plurality of detection results for each measurement point is a method of obtaining one detection result for each measurement point on a test surface, changing the distance L after that, obtaining another detection result for the measurement point, and repeating these steps. In this method, as shown in FIG. 4, the processor 40 causes the detector 30 to detect an optical path length difference at each measurement point while causing the changing unit 50 to change the relative positions (in the XY direction) of the test surface 1 and optical system 20. Then, the processor causes the changing unit 50 to change the distance L by ½ of the cycle T of the cyclic error, and causes the detector 30 to detect an optical path length difference at each measurement point in this state while causing the changing unit 50 to change the relative positions (in the XY direction) of the test surface 1 and optical system 20. That is, in this method, the step of causing the detector 30 to detect an optical path length difference at each measurement point on the test surface while causing the changing unit 50 to change the relative positions (in the XY direction) of the test surface 1 and optical system 20 is performed in each of a plurality of states in which the distances L are different from each other. Accordingly, the processor 40 can obtain a plurality of detection results for each measurement point on the test surface within a measurement time shorter than that in the method of repeating the steps of obtaining a plurality of detection results at one measurement point.

Figure 5:
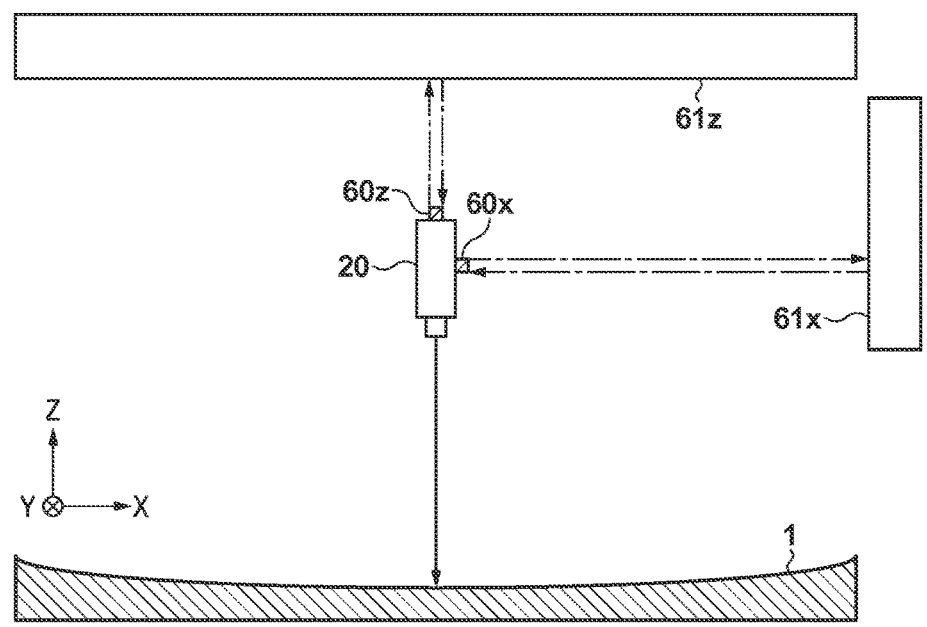
FIG. 5 is a view showing an arrangement example for measuring the position coordinates of an optical system 20.

The processor 40 can determine the position coordinates of the optical system 20 based on a signal from an interferometer provided in the optical system 20. For example, as shown in FIG. 5, the optical system 20 includes a plurality of interferometers 60 for detecting the positions of the optical system 20 in the X, Y, and Z directions. FIG. 5 shows an interferometer 60x for detecting the position of the optical system 20 in the X direction, and an interferometer 60z for detecting the position of the optical system 20 in the Z direction. The interferometer 60x can irradiate an X standard mirror 61x with a laser beam, and detect a displacement (in the X direction) of the optical system 20 from a standard position based on interference between a laser beam reflected by the X standard mirror 61x and a laser beam reflected by a reference surface included in the interferometer 60x. Likewise, the interferometer 60z can irradiate a Z standard mirror 61z with a laser beam, and detect a displacement (in the Z direction) of the optical system 20 from a standard position based on interference between a laser beam reflected by the Z standard mirror 61z and a laser beam reflected by a reference surface included in the interferometer 60z.

In the above explanation, the detector 30 detects an optical path length difference in each of the two states in which the distances L are different from each other by ½ of the cycle T of the cyclic error, thereby obtaining two detection results for each measurement point. However, the present invention is not limited to this. For example, it is also possible to cause the detector 30 to detect an optical path length difference in each of n states in which the distances L are different from each other by 1/n of the cycle T, and obtain n detection results for each measurement point.

Third Embodiment

Figure 6A:
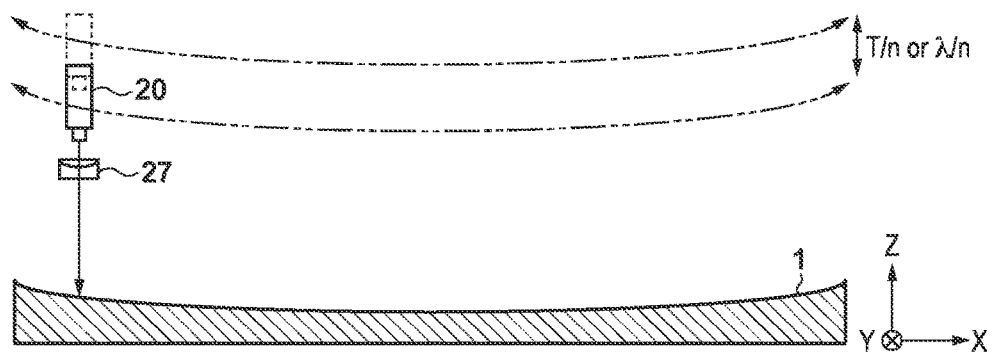
FIG. 6A is a view showing an arrangement example of a measurement apparatus including a condenser lens.
Figure 6B:
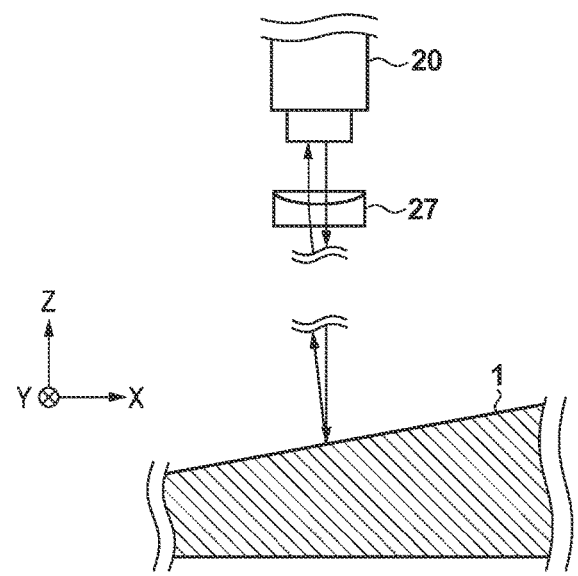
FIG. 6B is a view showing the arrangement example of the measurement apparatus including the condenser lens.

A measurement apparatus of the third embodiment according to the present invention will be explained. When an optical system 20 irradiates a test surface 1 with light and receives test light 13, if the test surface 1 is not a flat surface as shown in FIG. 6A, the optical path of incident light to the test surface 1 and that of reflect light from it can be different. In this case, almost no reflected light is incident on the optical system 20, so it may become difficult to detect the optical path length difference between reference light 12 and the test light 13 based on an interference signal generated by interference between the reference light 12 and test light 13. As shown in FIG. 6B, therefore, the measurement apparatus of the third embodiment can include a condenser lens 27 on the optical path between the optical system 20 and test surface 1. The condenser lens 27 is so configured that light (reflected light) which irradiates the test surface 1 having an inclination and is reflected by the test surface 1 is transmitted through the condenser lens 27. This light becomes parallel to the light emitted from the optical system 20. That is, the condenser lens 27 is so configured that the light emitted from the optical system 20 and the light reflected by the test surface 1 are parallel between the optical system 20 and condenser lens 27. Even when the test surface 1 is not a flat surface, therefore, the reflected light from the test surface 1 can be incident on the optical system 20, so the optical path length difference can be detected. Although FIG. 6 shows the optical system 20 and condenser lens 27 as separate components, the optical system 20 may also include the condenser lens 27. In this case, the condenser lens 27 can be placed on the optical path between a polarizing beam splitter 22 and the test surface 1.

Fourth Embodiment

Figure 7:
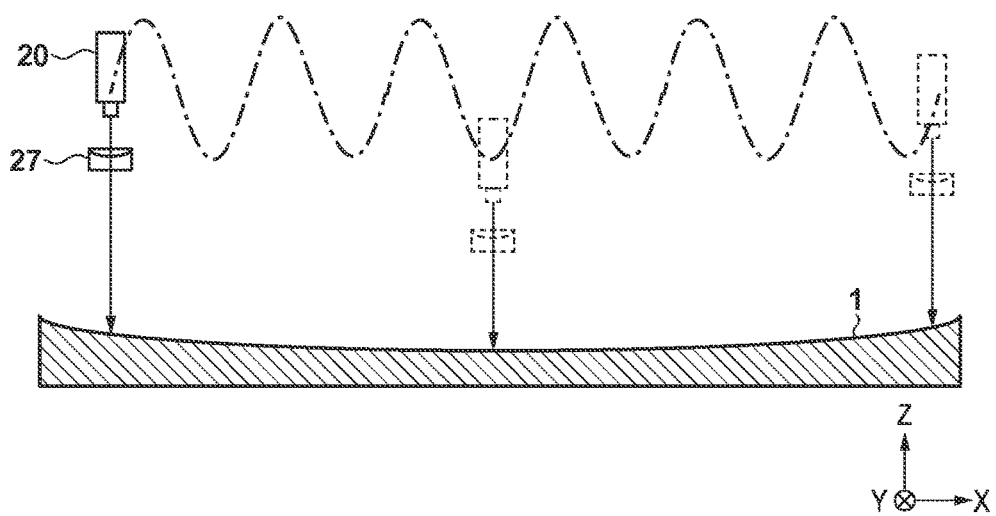
FIG. 7 is a view showing a driving example of the optical system.

A measurement apparatus of the fourth embodiment according to the present invention will be explained. In a measurement apparatus, as described previously, a cyclic error having a predetermined cycle T can occur in the detection result of an optical path length difference. In the measurement apparatus of the fourth embodiment, therefore, when a detector 30 detects an optical path length difference while changing the relative positions (in the XY direction) of an optical system 20 and test surface 1, the distance (in the Z direction) between the optical system 20 and test surface is changed in accordance with the cycle T of a cyclic error, as shown in FIG. 7. That is, the measurement apparatus of the fourth embodiment causes the detector 30 to detect an optical path length difference at each of a plurality of measurement points on a test surface while vibrating the optical system 20 in accordance with the cycle T of a cyclic error. An amplitude when vibrating the optical system 20 may be 1/n (n≥2) of the cycle T of a cyclic error obtained beforehand, or 1/n (n≥2) of a wavelength λ of light emitted from a light source 10. The optical system 20 may be vibrated at a cycle shorter than a sampling cycle in measurement. That is, the optical system 20 may be driven by at least one cycle between two measurement points where measurement is successively performed.

Fifth Embodiment

Figure 8:
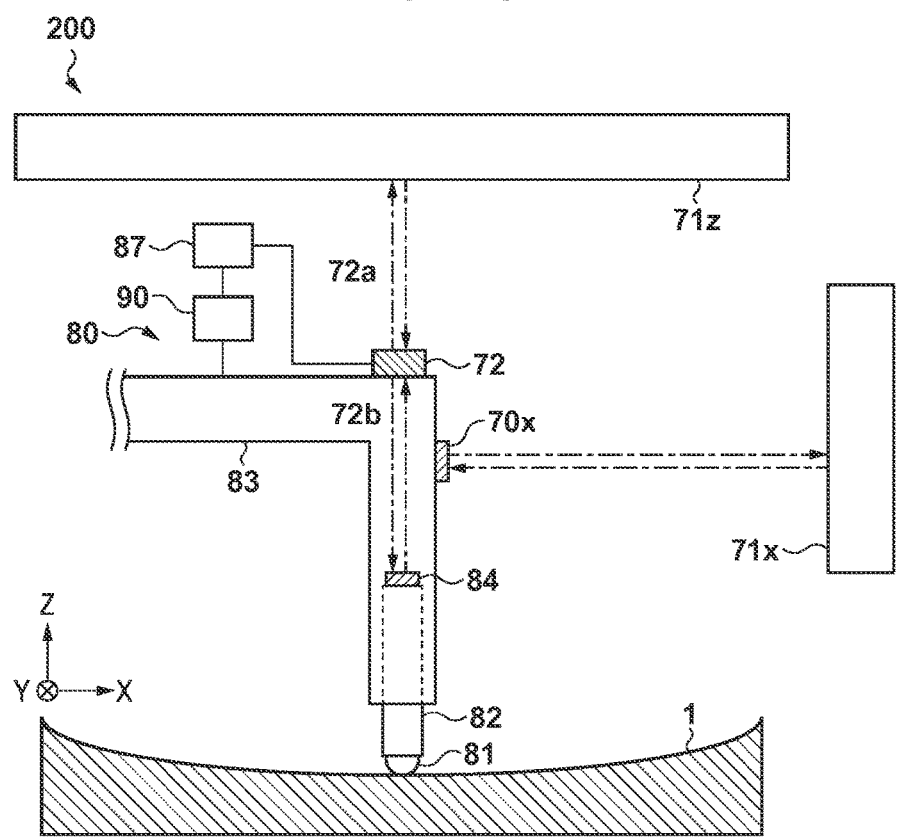
FIG. 8 is a schematic view showing a measurement apparatus of the fifth embodiment.

A measurement apparatus 200 of the fifth embodiment according to the present invention will be explained with reference to FIG. 8. FIG. 8 is a schematic view showing the measurement apparatus 200 of the fifth embodiment. The measurement apparatus 200 is a contact type measurement apparatus which measures the shape of a test surface 1 by scanning a probe 80 on the test surface 1 in a state in which the probe 80 is in contact with the test surface 1. The probe 80 includes a probe shaft 82 having a distal end to which a distal end sphere 81 is attached, and a holding member 83 for holding the probe shaft 82. The probe 80 can be driven by a driver 90.

Shape data of the test surface 1 is obtained based on the coordinates (XYZ coordinates) of the probe shaft 82, and the coordinates of the probe shaft 82 are obtained based on detection results obtained by a plurality of detectors (for example, interferometers) formed in the holding member 83 of the probe 80. The X coordinate of the probe shaft 82 is calculated based on an optical path length between a detector 70x fixed on the X-direction side of the holding member 83 and an X standard mirror 71x. The optical path length between the detector 70x and X standard mirror 71x is calculated by using interfering light generated by light emitted in the X direction from the detector 70x and reflected by the X standard mirror 71x, and light reflected by a reference surface included in the detector 70x. Similarly, the Y coordinate of the probe shaft 82 is calculated based on an optical path length between a detector (not shown) fixed on the Y-direction side of the holding member 83 and a Y standard mirror (not shown).

The Z coordinate of the probe shaft 82 is calculated based on a distance 72a in the Z direction between the holding member 83 (the probe 80) and a Z standard mirror 71z (a standard surface), and a distance 72b in the Z direction between the holding member 83 and probe shaft 82. A controller 87 having the function of a processor 40 calculates the distance 72a between the holding member 83 and Z standard mirror 71z based on an optical path length between a detector 72 and the Z standard mirror 71z. The detector 72 (an interferometer) fixed on the Z-direction side of the holding member 83 detects the optical path length between the detector 72 and Z standard mirror 71z. The detector 72 irradiates the Z standard mirror 71z and a reference surface included in the detector 72 with light, and detects interfering light generated by light (test light) reflected by the Z standard mirror 71z and light (reference light) reflected by the reference surface. Consequently, the detector 72 can detect the optical path length between the detector 72 and Z standard mirror 71z. The optical path length between the detector 72 and Z standard mirror 71z will be called a first optical path length hereinafter.

Also, the controller 87 calculates the distance 72b in the Z direction between the holding member 83 and probe shaft 82 based on an optical path length between the detector 72 and an optical surface of an optical element 84 formed on the probe shaft 82. The detector 72 detects the optical path length between the detector 72 and the optical surface of the optical element 84. The detector 72 can irradiate the optical surface of the optical element 84 and a reference surface included in the detector 72 with light, and detect the optical path length between the detector 72 and the optical surface of the optical element 84 by using interfering light generated by light reflected by the optical surface of the optical element 84 and light reflected by the reference surface. The optical path length between the detector 72 and the optical surface of the optical element 84 will be called a second optical path length. The detector 72 may be so configured that the reference surface to be used to calculate the distance 72a and the reference surface to be used to calculate the distance 72b are formed in one optical element. Consequently, the detector 72 can simultaneously measure the distances 72a and 72b, and the change amounts of the distances 72a and 72b with respect to a disturbance fluctuation occurring on the probe 80 can be made equal.

Figure 9:
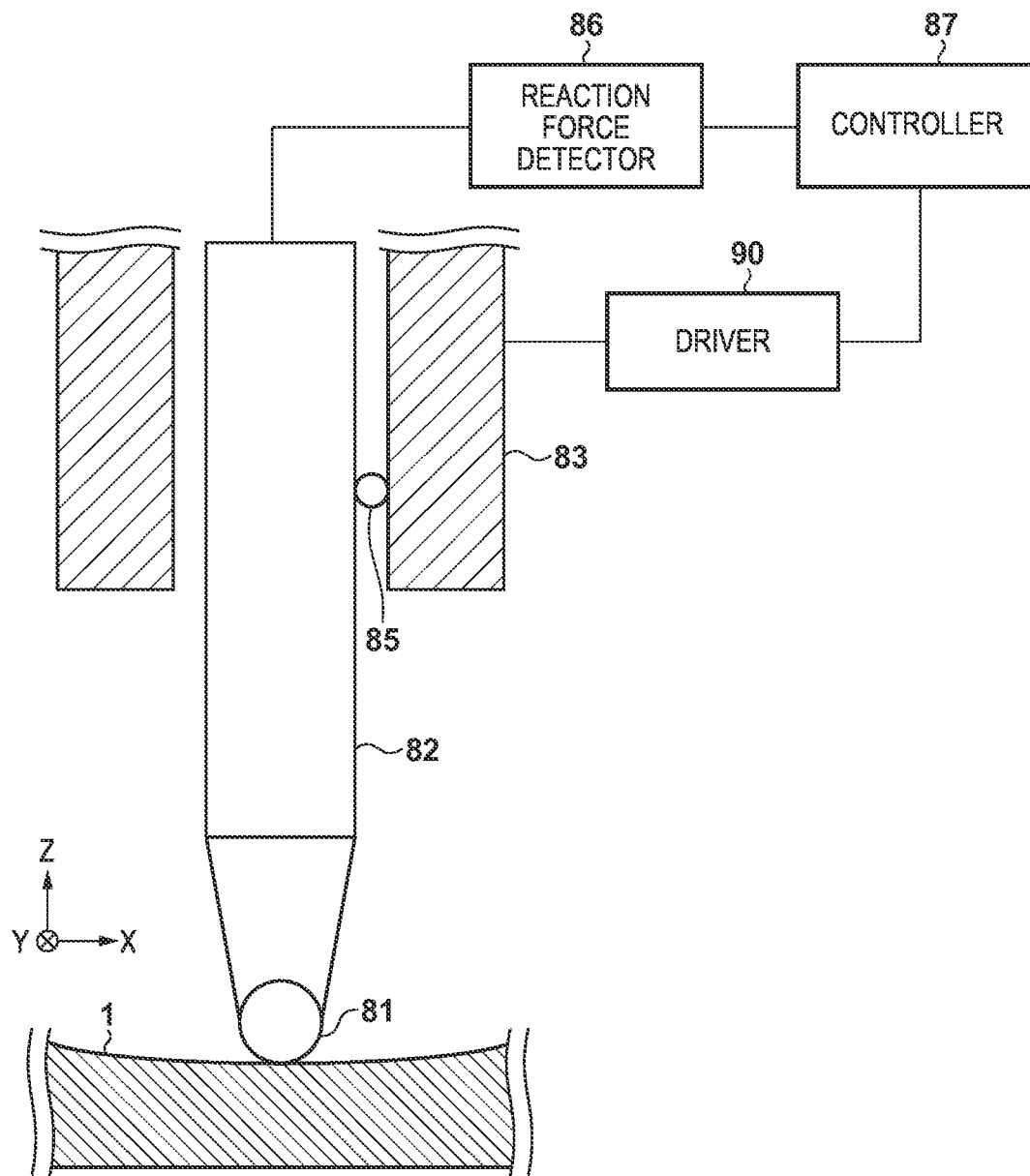
FIG. 9 is a view showing the distal end of a probe shaft.

As shown in FIG. 9, a driver 90 drives the probe 80 such that the distance 72b is constant based on the second optical path length detected by the detector 72, while the distal end sphere 81 attached to the distal end of the probe shaft 82 is in contact with the test surface 1. FIG. 9 is a view showing the distal end of the probe shaft 82. A guide 85 guides the probe shaft 82 so that the probe shaft 82 can move in the gravity direction (Z direction).

Figure 10A:
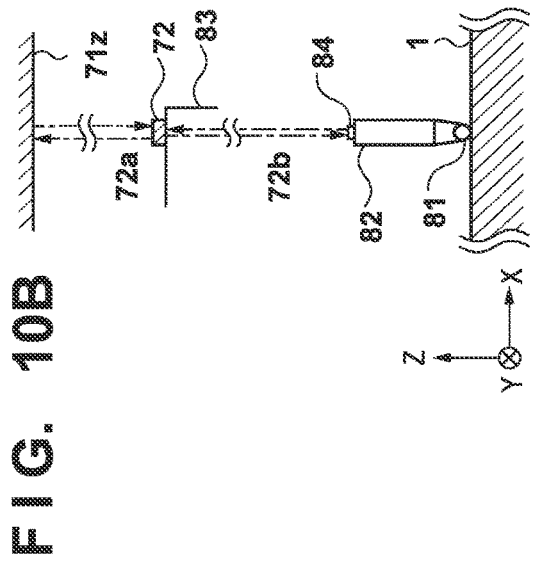
FIG. 10A is a view for explaining a method of extracting a cyclic error.
Figure 10B:
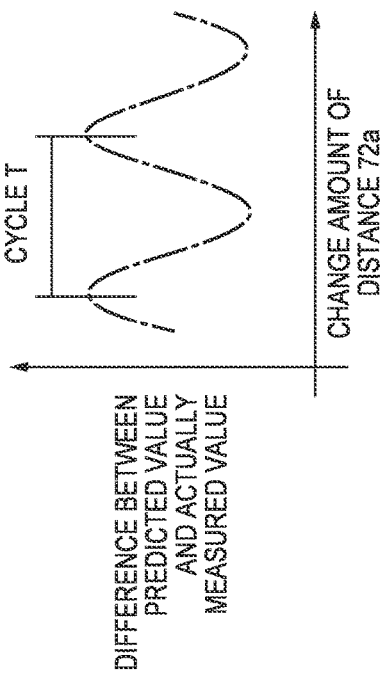
FIG. 10B is a view for explaining the method of extracting a cyclic error.

In the measurement apparatus 200 constructed as described above, a cyclic nonlinear error (cyclic error) can occur in the detection result (first optical path length) obtained by the detector 72 due to stray light generated by, for example, unintended reflection by an optical element included in the measurement apparatus 200. For example, when the probe shaft 82 moves in the Z direction as shown in FIG. 10A, the controller 87 controls the driver 90 to move the holding member 83 in the Z direction so that the distance 72b is constant. Consequently, the first optical path length changes because the detector 72 fixed to the holding member 83 also moves in the Z direction. Also, as shown in FIG. 10B, when the test surface 1 moves in the Z direction, the controller 87 similarly controls the driver 90 to move the holding member 83 in the Z direction so that the distance 72b is constant. Accordingly, the first optical path length changes because the detector 72 fixed to the holding member 83 also moves in the Z direction.

Figure 10C:
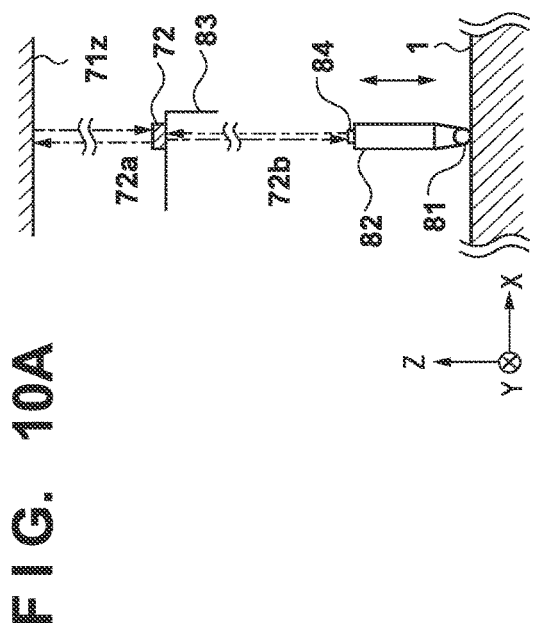
FIG. 10C is a view for explaining the method of extracting a cyclic error.
Figure 10D:
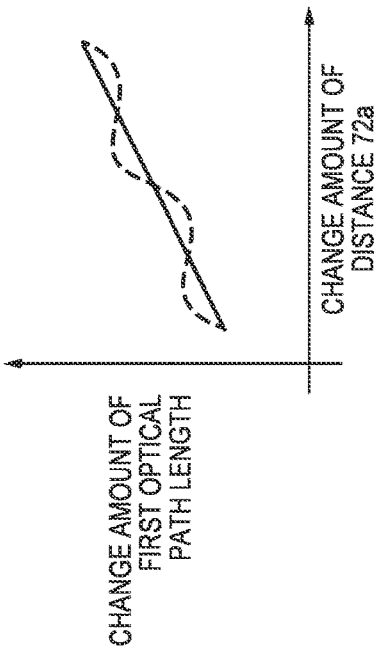
FIG. 10D is a view for explaining the method of extracting a cyclic error.

As a consequence, a cyclic error as indicated by the broken line in FIG. 10C can occur in the detection result (first optical path length) obtained by the detector 72. FIG. 10C is a view showing the relationship between a change amount of the distance 72a and that of the first optical path length. Referring to FIG. 10C, the solid line indicates a predicted value of the change amount of the first optical path length as a function of the change amount of the distance 72a, and the broken line indicates an actually measured value (the detection result obtained by the detector 72). In the measurement apparatus 200 shown in FIG. 8, the change amount of the distance 72a and that of the first optical path length are equal. As indicated by the solid line in FIG. 10C, therefore, the change amount of the first optical path length detected by the detector 72 presumably linearly changes with respect to the change amount of the distance 72a. In practice, however, as indicated by the broken line in FIG. 10C, the change amount of the first optical path length detected by the detector 72 does not linearly change with respect to the change amount of the distance 72a. When a difference between the predicted value (solid line) and actually measured value (broken line) shown in FIG. 10C is obtained, a cyclic fluctuation component is obtained as shown in FIG. 10D. This cyclic fluctuation component is a cyclic error, and a cycle T of the cyclic error can be obtained by this fluctuation component. FIG. 10D shows a cyclic error having one type of cycle T for the sake of simplicity. In practice, however, a plurality of stray light components are generated because light is reflected by a plurality of optical elements, and cyclic errors having a plurality of types of cycles (T1, T2, . . . ) appear.

Accordingly, the measurement apparatus 200 can also extract a cyclic error like the measurement apparatus 100. It is also possible to accurately determine the position of one measurement point on a test surface by canceling cyclic errors by performing the same processing as that of the measurement apparatus 100. For example, the controller 87 causes the detector 72 to detect the first optical path length in each of n states in which the distances 72a are different from each other by 1/n (n≥2) of the cycle T of the cyclic error, and determines the position (in the Z direction) of a measurement point based on the n detection results obtained by that. The measurement point is, for example, a point on a test surface with which the distal end sphere 81 of the probe 80 is in contact. By thus determining the positions of a plurality of measurement points on a test surface by using the above-mentioned processing, the measurement apparatus 200 including the probe 80 can accurately obtain the shape of the test surface.

Sixth Embodiment

Figure 11:
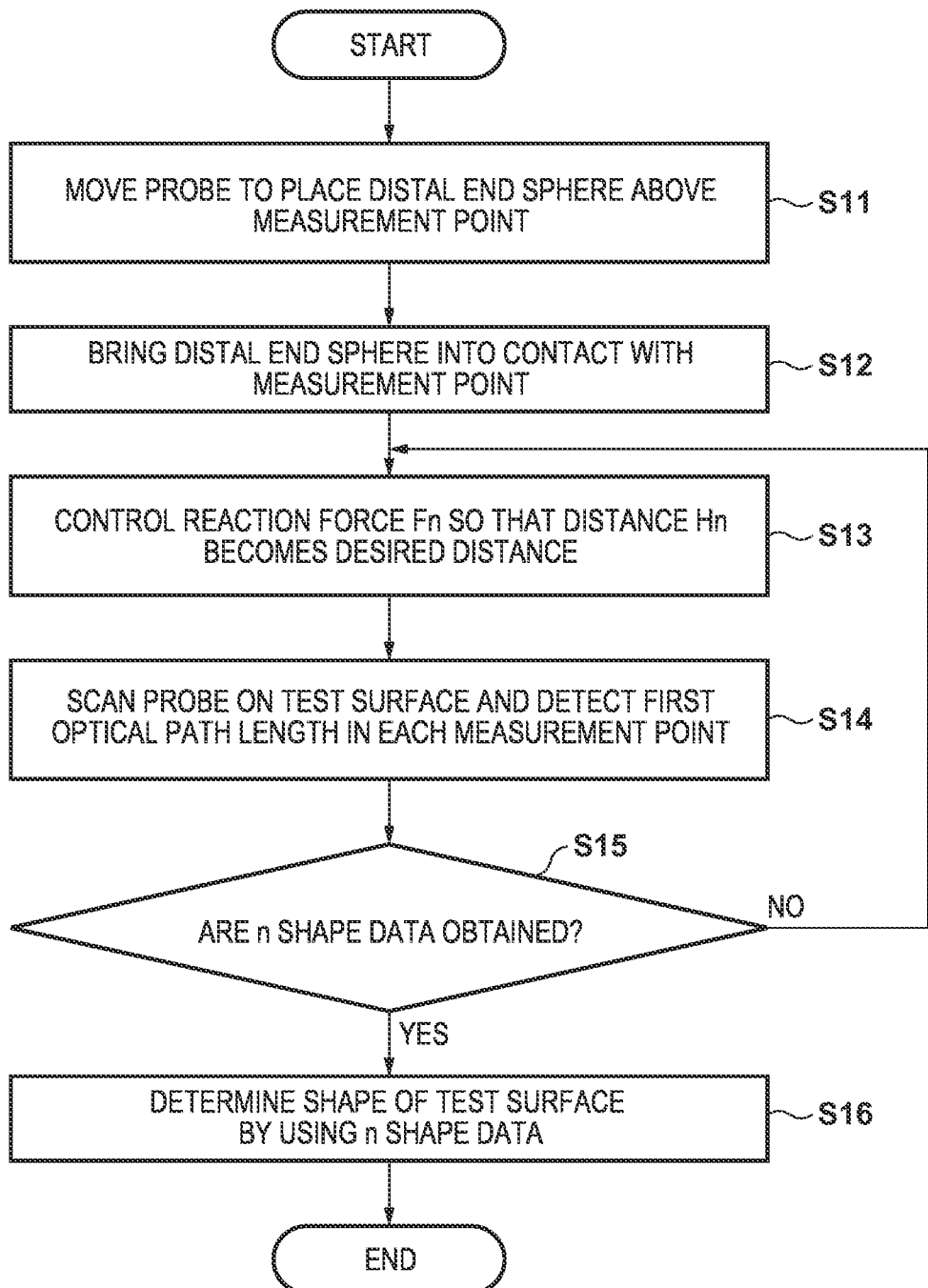
FIG. 11 is a flowchart showing a measurement operation of a measurement apparatus of the sixth embodiment.

A measurement apparatus of the sixth embodiment according to the present invention will be explained. This measurement apparatus of the sixth embodiment has the same apparatus configuration as that of the measurement apparatus 200 of the fifth embodiment, and a driver 90 drives a probe 80 (a holding member 83) so that a distance 72b is constant. Letting k be the stiffness of the probe 80, H be the distance 72b from a detector 72 to the optical surface of an optical element 84, and F be a reaction force which the probe (a probe shaft 82) receives from a test surface 1, the relationship between them can be represented by equation (3) from Hooke's law. Accordingly, the distance H when the stiffness k is constant is determined by the value of the reaction force F. When measuring the shape of the test surface 1, therefore, it is favorable to control the reaction force F such that the distance H is constant. That is, a control command value of the reaction force F need only be determined in accordance with the distance H. This control can be performed in accordance with a flowchart shown in FIG. 11. A measurement operation of the measurement apparatus will be explained with reference to the flowchart shown in FIG. 11:

$$F = k \cdot H \Leftrightarrow H = F/k \quad (3)$$

In step S11, a controller 87 controls the driver 90 to place a distal end sphere 81 above a measurement point on a test surface, thereby moving the probe 80. In step S12, the controller 87 controls the driver 90 to move the holding member 83 in the −Z direction, thereby bringing the probe 80 (the distal end sphere 81) in contact with the measurement point. For example, the controller 87 causes the driver 90 to drive the holding member 83 configured to be movable via a guide 85, in the same direction as the direction in which the probe shaft 82 extends, that is, in the gravity direction (Z direction).

In step S13, the controller 87 controls a reaction force $F_n$ so that a distance $H_n$ becomes a desired distance. The reaction force $F_n$ can be detected by a reaction force detector 86. When the distal end sphere 81 comes in contact with the test surface 1 and the probe shaft 82 receives the reaction force F from the test surface 1, the probe shaft 82 is pushed upward in the +Z direction. When the probe shaft 82 is pushed upward, the optical surface of the optical element 84 attached to the probe shaft 82 is also pushed upward in the +Z direction, so the distance H changes. Therefore, to make the distances $H_n$ equal in n states when the stiffness k of the probe shaft 82 is constant, the reaction force $F_n$ in each of the n states may be controlled based on the detection result obtained by the reaction force detector 86. In this case, the reaction forces $F_n$, in the n states can be different from each other. For example, the controller 87 controls the reaction force $F_n$ to $F_1$ in the first state so that the distance $H_n$ becomes a desired distance, and controls the reaction force $F_n$ to $F_2$ in the second state so that the distance $H_n$ becomes a desired distance. As described previously, the n states are a plurality of states in which the distances 72a between the detector 72 and a Z standard mirror 71z (the distances between the probe 80 and a standard surface) are different from each other by 1/n of the cycle of a cyclic error.

In step S14, while controlling the movement of the holding member 83 in the Z direction such that the distance $H_n$ is constant, the controller 87 scans the probe 80 (the distal end sphere 81) on the test surface, and causes the detector 72 to detect a first optical path length difference at each measurement point on the test surface. Accordingly, the controller 87 can obtain shape data S1 (X1, Y1, Z1) of the test surface 1. In step S15, the controller 87 determines whether shape data S of the test surface 1 is obtained in each of the n states, that is, whether n shape data S are obtained. If the n shape data S are obtained, the controller 87 stops obtaining the shape data S of the test surface 1. On the other hand, if the n shape data S are not obtained, the controller 87 changes the distance 72a between the detector 72 and Z standard mirror 71z by 1/n of a cycle T, and repeats steps S13 to S15. In step S16, the controller 87 determines the shape of the test surface 1 by using the n obtained shape data S. In the measurement apparatus of the sixth embodiment as described above, the shape data S of the test surface 1 is obtained in each of the n states in which the distances 72a between the detector 72 and Z standard mirror 71z are different from each other by 1/n of the cycle T. This makes it possible to accurately determine the shape of the test surface 1 by canceling cyclic errors contained in the shape data S.

Seventh Embodiment

A measurement apparatus of the seventh embodiment according to the present invention will be explained. This measurement apparatus of the seventh embodiment has the same apparatus configuration as that of the measurement apparatus 200 of the fifth embodiment, and a driver 90 drives a probe 80 (a holding member 83) such that a distance 72b is constant. Also, as represented by equation (3) described above, a distance H when a reaction force F is constant is determined by the value of a stiffness k. When measuring the shape of a test surface 1, therefore, the stiffness k of the probe may be controlled in order to hold the distance H constant. The stiffness k of the probe is controlled by, for example, using a probe shaft 82 having a desired stiffness k corresponding to the distance H, or changing the arrangement of the holding member 83 for holding the probe shaft 82. This control is performed in accordance with a flowchart shown in FIG. 12. A measurement operation of the measurement apparatus will be explained with reference to the flowchart shown in FIG. 12.

In step S21, a controller 87 controls the driver 90 to place a distal end sphere 81 above a measurement point on the test surface, thereby moving the probe 80. In step S22, the controller 87 controls the driver 90 to move the holding member 83 in the −Z direction, thereby bringing the probe 80 (the distal end sphere 81) into contact with the measurement point.

In step S23, the controller 87 controls a stiffness $k_n$ of the probe 80 so that a distance $H_n$ becomes a predetermined distance. This control of the stiffness $k_n$ of the probe 80 is to, for example, exchange the probe shaft 82, or change the arrangement of the holding member 83 for holding the probe shaft 82. When the distal end sphere 81 comes in contact with the test surface 1 and receives a reaction force $F_n$, the probe shaft 82 is pushed upward in the +Z direction. When the probe shaft 82 is pushed upward, the optical surface of an optical element 84 attached to the probe shaft 82 is also pushed upward in the +Z direction, so the distance H changes. When the reaction force $F_n$ in each of n states is constant, therefore, it is favorable to make the stiffnesses $k_n$ in the n states different in order to make the distances $H_n$ in the n states equal. For example, the measurement apparatus includes a plurality of probe shafts 82 (including the distal end spheres 81) different in stiffness, and exchanges the probe shaft 82 with the probe shaft 82 having the stiffness $k_n$ by which the distance $H_n$ and reaction force $F_n$ become their respective desired values. For example, the controller 87 exchanges the probe shaft 82 to the probe shaft 82 having a stiffness $k_1$ by which the distance $H_n$ and reaction force $F_n$ become their respective desired values in the first state, and exchanges the probe shaft 82 to the probe shaft 82 having a stiffness $k_2$ by which the distance $H_n$ and reaction force $F_n$ become their respective desired values in the second state. As described previously, the n states are a plurality of states in which distances 72a between a detector 72 and Z standard mirror 71z (distances between the probe 80 and a standard surface) are different from each other by 1/n of the cycle of a cyclic error.

In step S24, while controlling the movement of the holding member 83 in the Z direction such that the distance $H_n$ and reaction force $F_n$ are constant, the controller 87 scans the probe 80 (the distal end sphere 81) on the test surface, and causes the detector 72 to detect a first optical path length difference at each measurement point on the test surface. Accordingly, the controller 87 can obtain shape data S1 (X1, Y1, Z1) of the test surface 1. In step S25, the controller 87 determines whether shape data S of the test surface 1 is obtained in each of the n states, that is, whether n shape data S are obtained. If the n shape data S are obtained, the controller 87 stops obtaining the shape data S of the test surface 1. On the other hand, if the n shape data S are not obtained, the controller 87 changes the distance 72a between the detector 72 and Z standard mirror 71z by 1/n of a cycle T, and repeats steps S23 to S25. In step S26, the controller 87 determines the shape of the test surface 1 by using the n obtained shape data S. In the measurement apparatus of the seventh embodiment as described above, the shape data S of the test surface 1 is obtained in each of the n states in which the distances 72a between the detector 72 and Z standard mirror 71z are different from each other by 1/n of the cycle T. This makes it possible to accurately determine the shape of the test surface 1 by canceling cyclic errors contained in the shape data S.

Figure 13A:
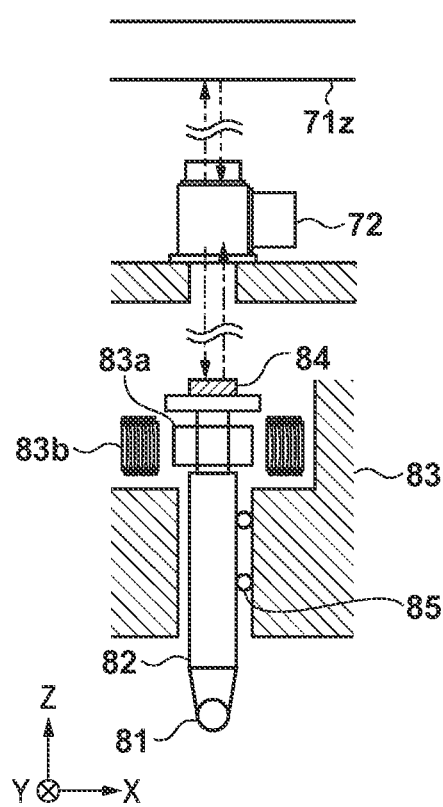
FIG. 13A is a view showing an arrangement example of a probe.
Figure 13B:
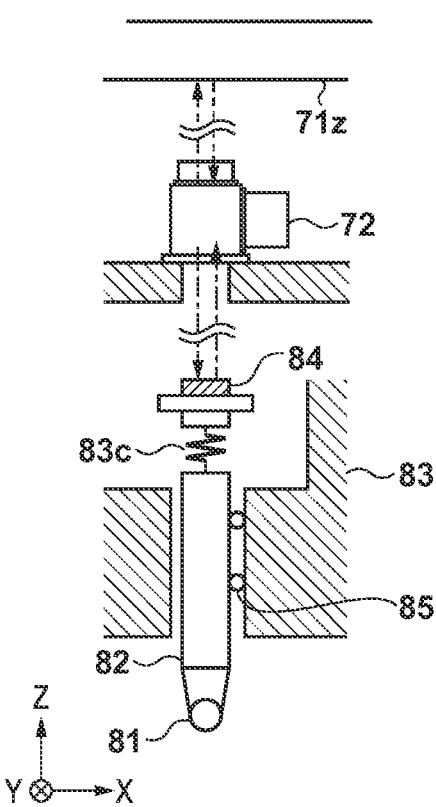
FIG. 13B is a view showing another arrangement example of the probe.

The probe 80 can be given a desired stiffness by forming the probe shaft 82 by changing its material or shape. When the material or shape of the probe shaft 82 is changed, however, the measurement accuracy may decrease because, for example, a contact mark is formed on the test surface 1, or the abrasion amount of the distal end sphere 81 increases due to contact scanning. Accordingly, it is favorable to give the probe 80 a desired stiffness by changing only the arrangement of the holding member 83 for holding the probe shaft 82, without changing the material or shape of the probe shaft 82. FIGS. 13A and 13B are views showing configuration examples of the probe 80.

The probe 80 shown in FIG. 13A uses a permanent magnet 83a and electromagnet 83b in the holding member 83 for holding the probe shaft 82, and the probe shaft 82 is magnetically floated and held by the magnetic forces of the permanent magnet 83a and electromagnet 83b. By thus forming the probe 80, a desired stiffness can be obtained by controlling the magnetic forces of the permanent magnet 83a and electromagnet 83b. The magnetic forces can be controlled by hardware or software. Examples of the method of controlling the stiffness of the probe 80 by hardware are the following three methods:

1) Change the permanent magnet 83a to a permanent magnet having a different magnetic force.
2) Change the number of turns of the coil of the electromagnet 83b.
3) Change the material of the core of the coil.

On the other hand, an example of the method of controlling the stiffness of the probe 80 by software is to control an electric current to be supplied to the electromagnet 83b. A desired stiffness can be obtained because the magnetic force of the electromagnet 83b can be changed to a desired magnetic force by controlling a command value of the electric current to be supplied to the electromagnet 83b. Also, the probe 80 shown in FIG. 13B includes a leaf spring 83c as one constituent element of the holding member 83 for holding the probe shaft 82. Accordingly, the probe 80 shown in FIG. 13B can be given a desired stiffness by preparing a plurality of probes 80 including the leaf springs 83c different in stiffness.

Eighth Embodiment

A measurement apparatus of the eighth embodiment according to the present invention will be explained. This measurement apparatus of the eighth embodiment shown in FIG. 14 has an arrangement in which the measurement apparatus shown in FIG. 5 is provided in a chamber 300. A test surface 1 (a test object) is mounted on a stage 101, and the stage 101 is mounted on a base 102. In the measurement apparatus as described previously, a cyclic error having a predetermined cycle T occurs in the detection result of an optical path length difference. In the measurement apparatus of the eighth embodiment, therefore, the position of each of a plurality of measurement points on the test surface is determined based on detection results obtained by a detector 30 in a plurality of states in which the optical path lengths of test light 13 are different from each other. Then, the shape of the test surface 1 is measured based on the determined positions of the measurement points.

Figure 14:
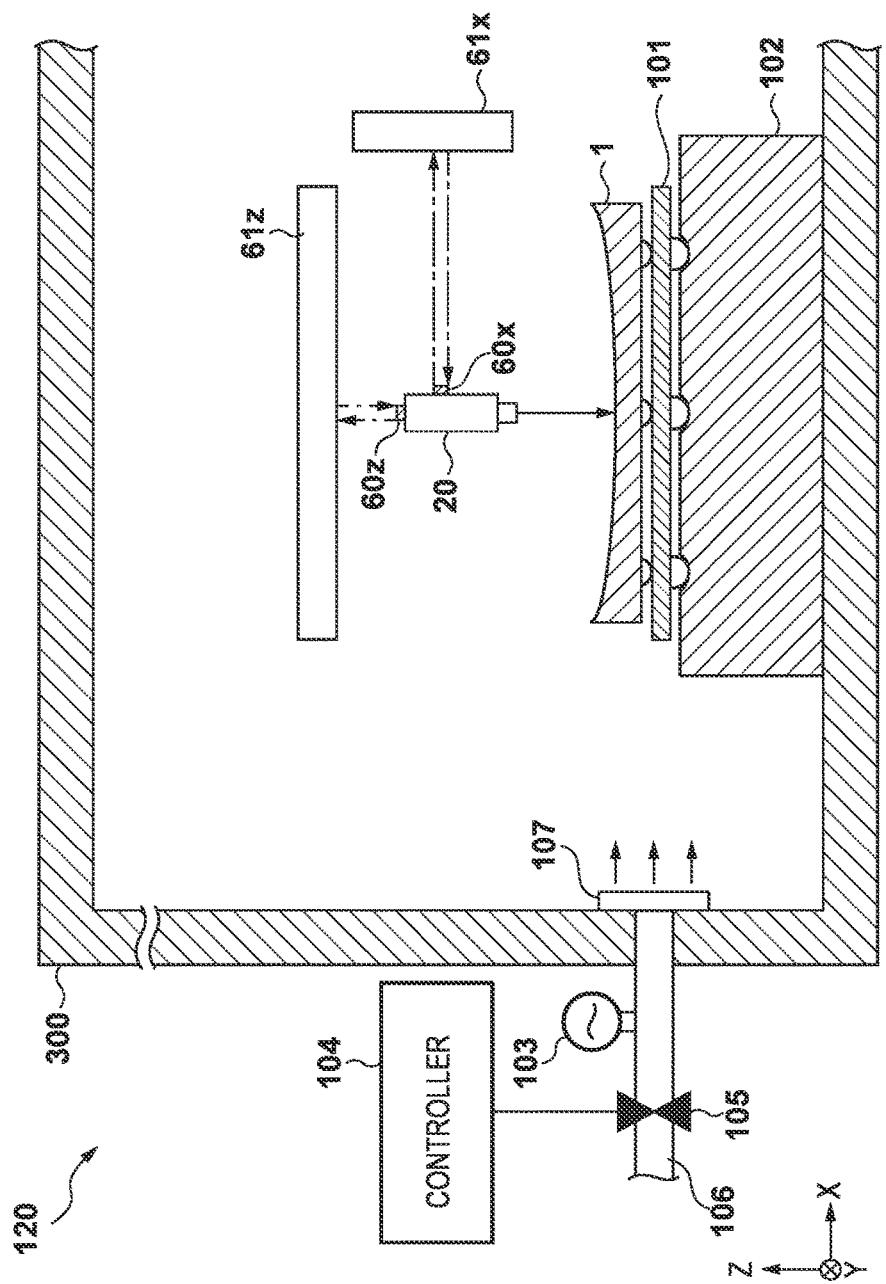
FIG. 14 is a schematic view showing a measurement apparatus of the eighth embodiment.

In each of the first to fifth embodiments, the example in which the optical path length of the test light 13 is changed by changing the distance between the optical system 20 and test surface 1 is explained. On the other hand, in the eighth embodiment, an example in which the optical path length of the test light 13 is changed by changing the refractive index of a space between the optical system 20 and test surface 1 (this space will simply be referred to as "the space" hereinafter) by a refractive index changing unit 120 by changing the pressure of a gas in the space will be explained. As shown in FIG. 14, the refractive index changing unit 120 can include a pressure gauge 103, controller 104, control valve 105, pipe 106, and supply/exhaust hole 107. The refractive index changing unit 120 changes the pressure of a gas in the space by supplying the gas into the chamber 300 through the pipe 106 and supply/exhaust hole 107, thereby changing the refractive index of the space. More specifically, the refractive index changing unit 120 adjusts the flow rate of the gas flowing through the pipe 106 by controlling the control valve 105 by the controller 104 based on the measurement result obtained by the pressure gauge 103, thereby setting the pressure of the gas in the space at a desired pressure. The pressure gauge 103 is so configured as to measure the pressure of a gas in the space, and attached to the pipe 106 in the eighth embodiment.

The optical path length of the test light 13 is obtained by integrating the actual distance between the optical system 20 and test surface by the refractive index of the space (the refractive index of a medium which transmits the test light 13). For example, letting ds be a spatial distance (actual distance) from a point A to a point B, and η be the refractive index of the medium which transmits the test light 13, an optical path length D of the test light 13 from the point A to the point B has a value obtained by integrating η×ds from the point A to the point B as indicated by equation (4). When the gas in the chamber 300 (the gas in the space) is the air, therefore, the optical path length D is the same as the spatial distance ds because the refractive index η of the air is "1":

$$D = \int_A^B \eta \times ds \quad (4)$$

Also, letting $\eta_0$ be the refractive index when the gas pressure is an initial pressure $P_0$, the refractive index η when the gas pressure is P can be obtained by equation (5). That is, as indicated by equation (5), the refractive index of the space can be changed by changing the pressure of the space. Therefore, the optical path length D of the test light 13 can be changed by changing the pressure of the space as indicated by equation (6) obtained from equations (4) and (5):

$$\eta^2 = 1 + \frac{P}{P_0}(\eta_0^2 - 1) \quad (5)$$

$$D = \int_A^B \sqrt{1 + \frac{P}{P_0}(\eta_0^2 - 1)} \quad (6)$$

In the measurement apparatus of the eighth embodiment as described above, a plurality of states in which the optical path lengths of the test light 13 are different from each other in accordance with the cycle T of a cyclic error can be generated by changing the pressure of a gas in the space by the refractive index changing unit 120. Accordingly, the measurement apparatus of the eighth embodiment can determine the position of a measurement point on the test surface 1 based on a plurality of (n) detection results obtained by the detector 30 by detecting the optical path length difference between reference light 12 and the test light 13 in the plurality of states.

When generating a plurality of (n) states, the refractive index changing unit 120 may change the pressure of the gas in the space such that the optical path lengths of the test light 13 in the plurality of states are different from each other by 1/n (n≥2) of the cyclic T of a cyclic error obtained beforehand. The refractive index changing unit 120 may also change the pressure of the gas in the space such that the optical path lengths of the test light 13 in the plurality of (n) stages are different from each other by 1/n (n≥2) of a wavelength λ of light emitted from a light source 10. Furthermore, the refractive index changing unit 120 may also change the pressure of the gas in the space so as to be able to change the optical path length of the test light 13 at a cycle shorter than a sampling cycle in measurement. That is, it is only necessary to produce a pressure change which changes the optical path length of the test light 13 by at least one cycle between two measurement points where measurement is successively performed.

Ninth Embodiment

A measurement apparatus of the ninth embodiment according to the present invention will be explained. In the eighth embodiment, the example in which the optical path length of the test light 13 is changed by changing the refractive index of a space between the optical system 20 and test surface 1 (this space will simply be referred to as "the space" hereinafter) by the refractive index changing unit 120 by changing the pressure of a gas in the space is explained. On the other hand, in the ninth embodiment, an example in which the optical path length of test light 13 is changed by changing the refractive index of the space by a refractive index changing unit 120 by changing the composition (density) of a gas in the space will be explained.

Figure 15:
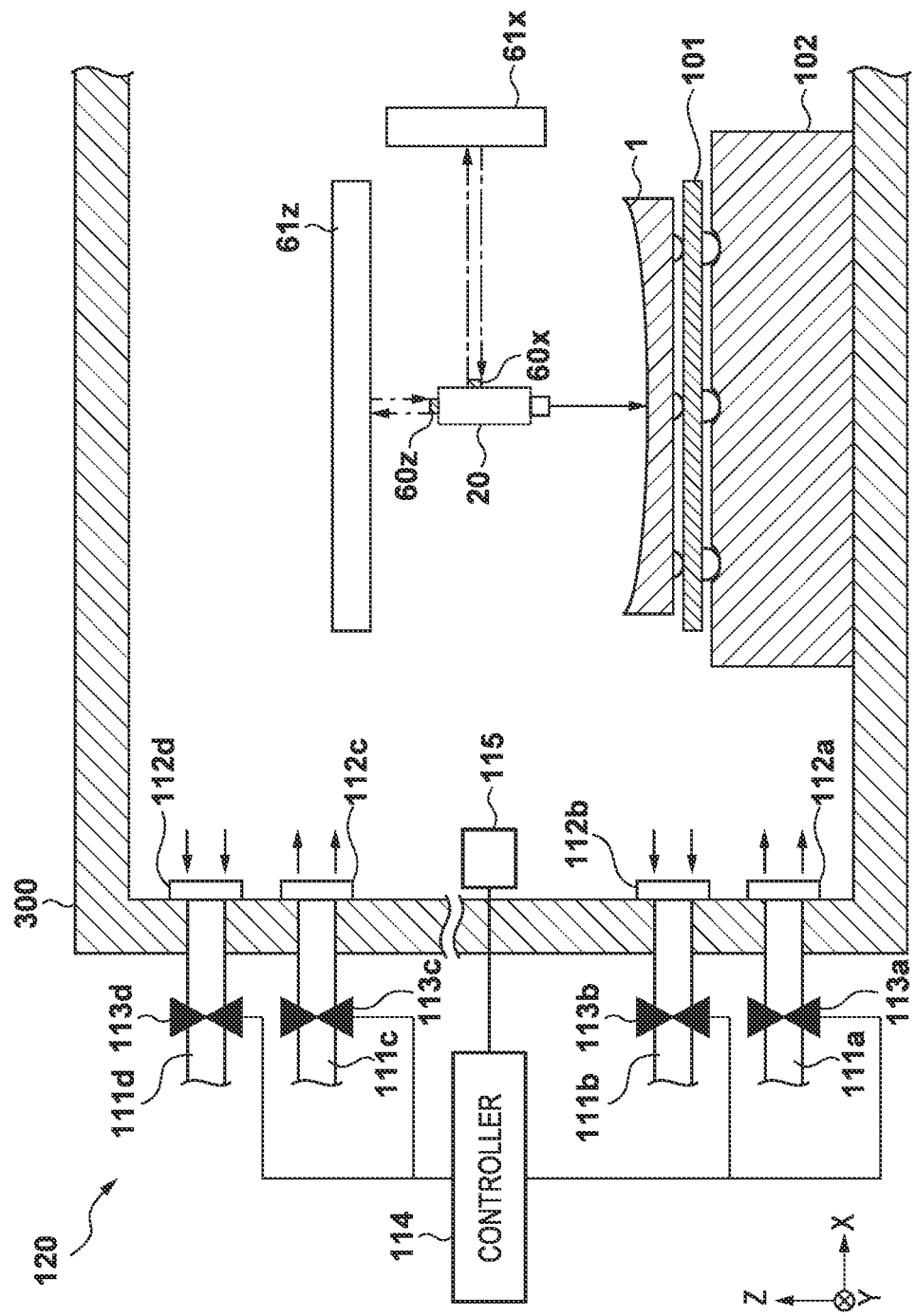
FIG. 15 is a schematic view showing a measurement apparatus of the ninth embodiment.

FIG. 15 is a view showing the measurement apparatus of the ninth embodiment. The refractive index changing unit 120 of the measurement apparatus of the ninth embodiment can include pipes 111a to 111d, supply/exhaust holes 112a to 112d, control valves 113a to 113d, and a controller 114. The refractive index changing unit 120 supplies a gas different from an internal gas of a chamber 300 into the chamber 300 through the pipes 111a to 111d and supply/exhaust holes 112a to 112d. The refractive index of the space changes in accordance with the composition (density) of a gas in the space. Therefore, by changing the composition of a gas in the space by changing the mixing ratio of a plurality of gases in the space, it is possible to change the refractive index of the space and change the optical path length of the test light 13 as indicated by equation (4). Accordingly, the measurement apparatus of the ninth embodiment can generate a plurality of states in which the optical path lengths of the test light 13 are different from each other in accordance with a cycle T of a cyclic error by changing the composition of a gas in the space by the refractive index changing unit.

Figure 16:
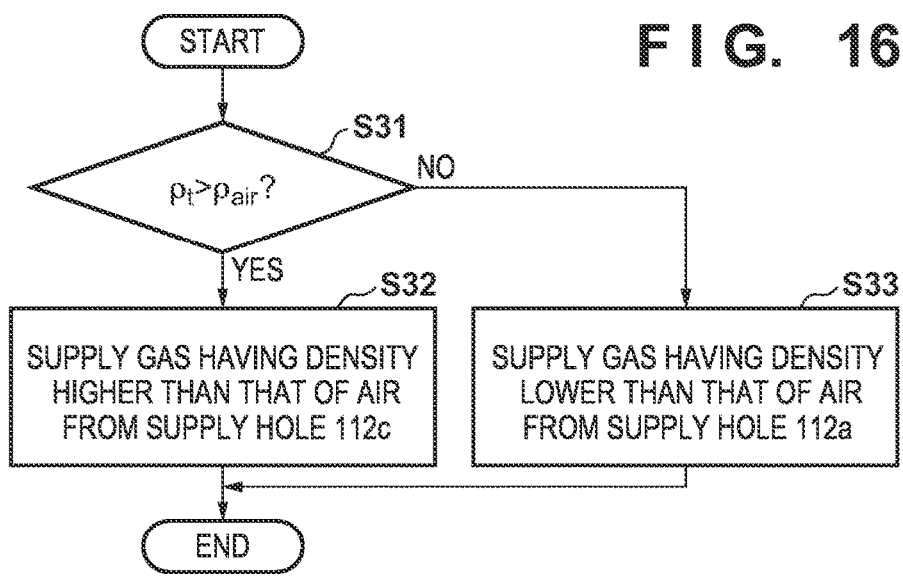
FIG. 16 is a flowchart showing a method of changing the density of a gas in a space.

A method of changing the composition (density) of a gas in the interior (that is, the space) of the chamber 300 by the refractive index changing unit 120 will be explained below. In this embodiment, a method of changing the density of a gas in the space by supplying a gas different from the air into the chamber 300 filled with the air by the refractive index changing unit 120 will be explained with reference to FIG. 16. FIG. 16 is a flowchart showing the method of changing the density of a gas in the space.

As shown in FIG. 15, the measurement apparatus of the ninth embodiment is so configured as to be able to supply and exhaust a gas different from the air in each of the upper and lower portions of the chamber 300. The pipe 111a, supply/exhaust hole 112a, and control valve 113a formed in the lower portion of the chamber 300 are so configured as to supply a gas having a density lower than that of the air into the chamber 300. The pipe 111c, supply hole 112c, and control valve 113c formed in the upper portion of the chamber 300 are so configured as to supply a gas having a density higher than that of the air into the chamber 300. The measurement apparatus of the ninth embodiment further includes a densitometer 115 for measuring the density of a gas in the chamber 300.

In step S31, the controller 114 determines whether a target density $\rho_t$ of a gas in the space is higher than a density $\rho_{air}$ of the air. The target density $\rho_t$ of a gas in the space is the density of a gas in the space, which is used to set the refractive index of the space at a target refractive index. If the target density $\rho_t$ is higher than the density $\rho_{air}$ of the air ($\rho_t > \rho_{air}$), the process advances to step S32. If the target density $\rho_t$ is lower than the density $\rho_{air}$ of the air ($\rho_t < \rho_{air}$), the process advances to step S33. In step S32, the controller 114 controls the control valves 113c and 113b based on the measurement result obtained by the densitometer 115, such that the gas having a density higher than that of the air is supplied from the supply hole 112c and exhausted from the exhaust hole 112b. In this step, the controller 114 may control the control valves 113c and 113b based on the measurement result obtained by the densitometer 115, so that the density of the gas in the space becomes a target density $\rho_0$. On the other hand, in step S33, the controller 114 controls the control valves 113a and 113d based on the measurement result obtained by the densitometer 115, such that the gas having a density lower than that of the air is supplied from the supply hole 112a and exhausted from the exhaust hole 112d. In this step, the controller 114 may control the control valves 113a and 113d based on the measurement result obtained by the densitometer 115, so that the density of the gas in the space becomes the target density $\rho_0$. By thus supplying and exhausting a gas having a density different from that of the air, it is possible to efficiently change the composition (density) of an internal gas of the chamber 300.

Figure 17:
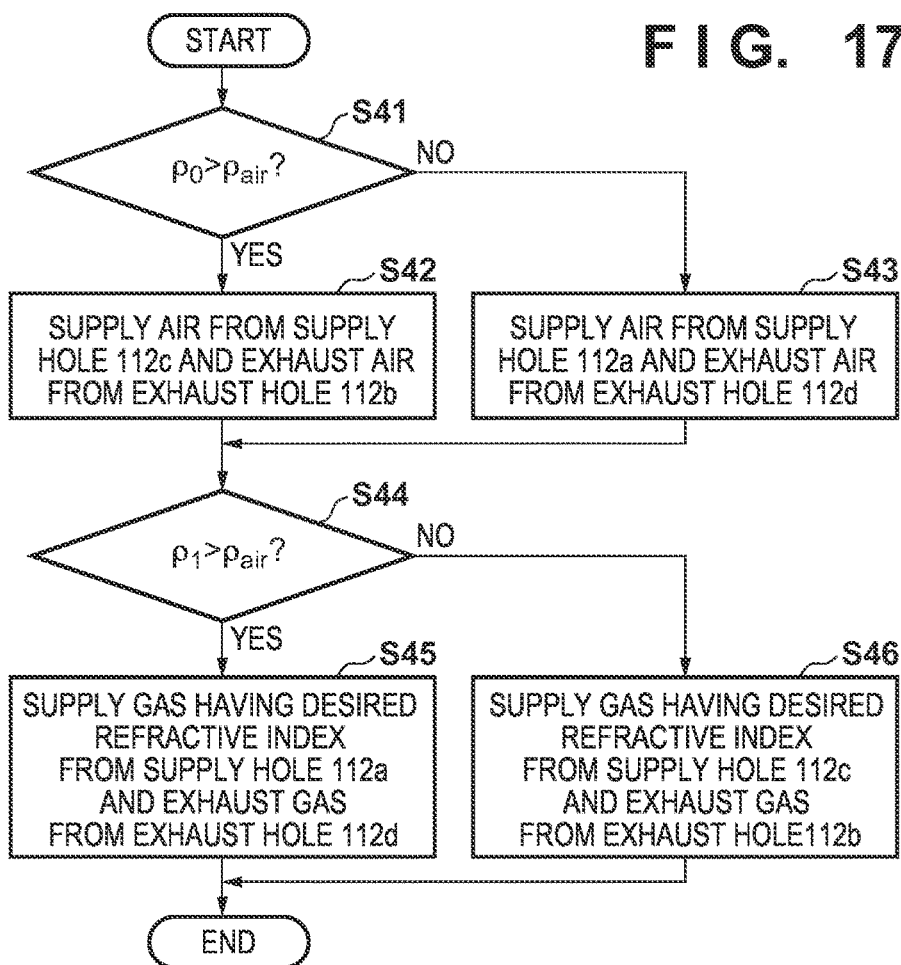
FIG. 17 is a flowchart showing a method of changing the density of a gas in a space.

Next, another method of changing the composition (density) of a gas in the interior (that is, the space) of the chamber 300 by the refractive index changing unit 120 will be explained. In this embodiment, a method of replacing the interior of the chamber 300 with the air once and replacing the interior of the chamber 300 with a gas different from the air after that will be explained with reference to FIG. 17. FIG. 17 is a flowchart showing the method of changing the density of a gas in the space. In the following explanation, let $\rho_0$ be the density of an actual gas in the chamber 300, $\rho_{air}$ be the density of the air, and $\rho_1$ be the density of a gas different from the air and having a desired refractive index.

In step S41, the controller 114 determines whether the density $\rho_0$ of a gas in the chamber 300 is higher than the density $\rho_{air}$ of the air. If the density $\rho_0$ is higher than the density $\rho_{air}$ of the air ($\rho_0 > \rho_{air}$), the process advances to step S42. If the density $\rho_0$ is lower than the density $\rho_{air}$ of the air ($\rho_0 < \rho_{air}$), the process advances to step S43. A gas having a density higher than that of the air moves down in the chamber 300 during the course of replacement. In step S42, therefore, the controller 114 controls the control valves 113c and 113b so that the air is supplied from the supply hole 112c and exhausted from the exhaust hole 112b. On the other hand, a gas having a density lower than that of the air moves up in the chamber 300 during the course of replacement. In step S43, therefore, the controller 114 controls the control valves 113a and 113d so that the air is supplied from the supply hole 112a and exhausted from the exhaust hole 112d.

After the chamber 300 is filled with the air, the process advances to step S44, and the controller 114 determines whether the density $\rho_{air}$ of the air is higher than the density $\rho_1$ of a gas having a desired refractive index (a gas different from the air). If the density $\rho_1$ is higher than the density $\rho_{air}$ of the air ($\rho_1 > \rho_{air}$), the process advances to step S45. If the density $\rho_1$ is lower than the density $\rho_{air}$ of the air ($\rho_1 < \rho_{air}$), the process advances to step S46. In step S45, the controller 114 controls the control valves 113a and 113d so that the gas having a desired refractive index is supplied from the supply hole 112a, and the air is exhausted from the exhaust hole 112d. On the other hand, in step S46, the controller 114 controls the control valves 113c and 113b so that the gas having a desired refractive index is supplied from the supply hole 112c, and the air is exhausted from the exhaust hole 112b. Consequently, the interior of the chamber 300 (that is, the space between the optical system 20 and test surface 1) can be replaced with the gas having a desired refractive index.

As the method of replacing a gas in the chamber 300, it is also possible to directly replace the gas with a gas having a desired refractive index without replacement with the air. For example, in the same manner as in the above-described operation, the controller 114 controls the control valves 113a to 113d based on the result of comparison of the density $\rho_0$ of the gas in the chamber 300 with the density $\rho_1$ of the gas having a desired refractive index. Consequently, the interior of the chamber 300 (that is, the space between the optical system 20 and test surface 1) can be replaced with the gas having a desired refractive index. Furthermore, the interior of the chamber 300 may also be filled with a plurality of gases in order to obtain a refractive index necessary to cause a desired change of optical path length. To perform this method, pipes, supply/exhaust holes, and switch valves may be provided for each of the plurality of gases with which the chamber is to be filled. The controller 114 can control the flow rate of a gas with which the chamber is to be filled.

Tenth Embodiment

Figure 18:
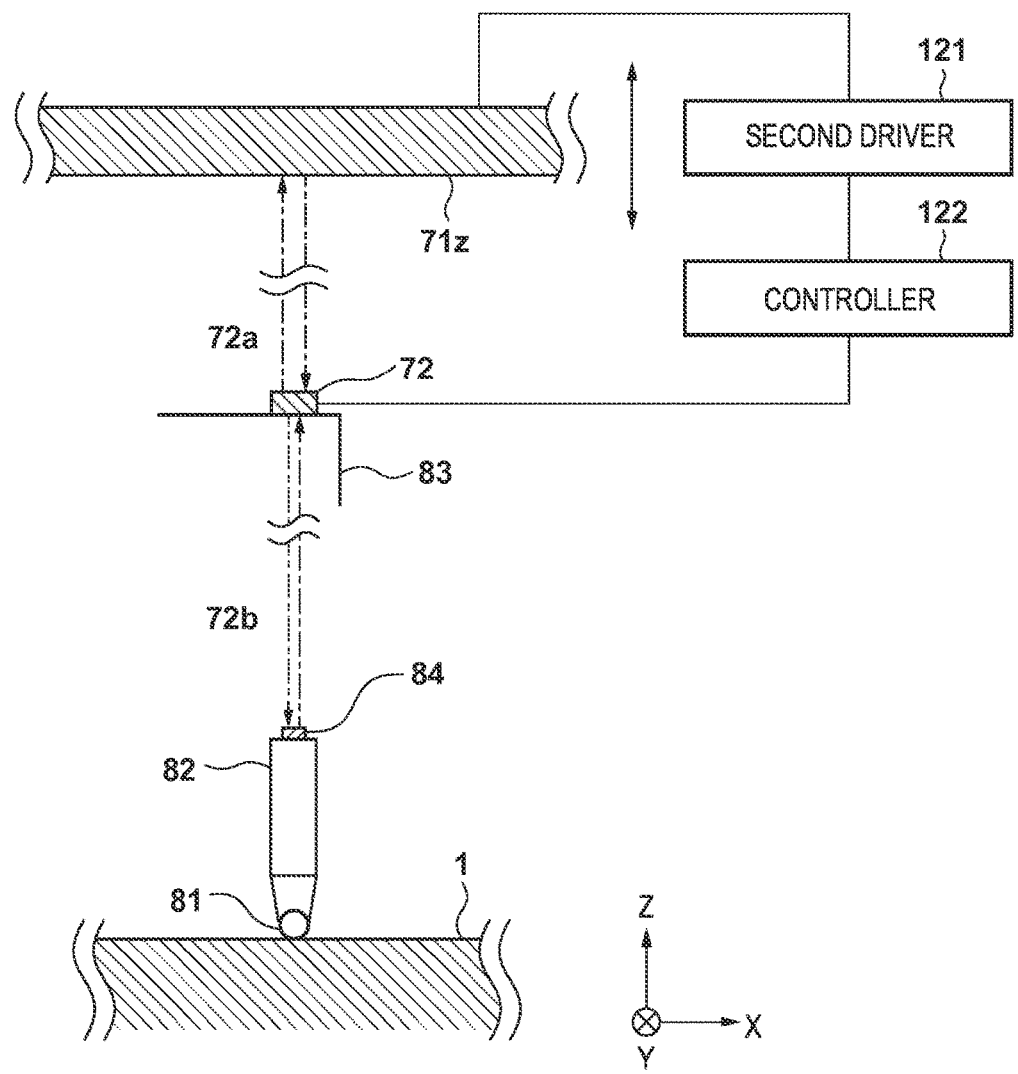
FIG. 18 is a schematic view showing a measurement apparatus of the 10th embodiment.

A measurement apparatus of the 10th embodiment according to the present invention will be explained. As shown in FIG. 18, this measurement apparatus of the 10th embodiment has the same configuration as that of the measurement apparatus 200 of the fifth embodiment. The measurement apparatus of the 10th embodiment further comprises a second driver 121 for driving a Z standard mirror 71z (a standard surface), and a controller 122 for controlling the second driver 121. The second driver 121 is used to change the position of the Z standard mirror 71z in a direction (for example, the Z direction) parallel to the optical axis of light from a detector 72 to the Z standard mirror 71z. The measurement apparatus 200 includes the detector 72 capable of simultaneously measuring a first optical path length (a distance 72a) and a second optical path length (a distance 72b). In the measurement apparatus 200 constructed as described above, a cyclic nonlinear error (cyclic error) can occur in the detection result obtained by the detector 72 due to stray light generated by, for example, unintended reflection by an optical element included in the measurement apparatus 200. As described above, as the method of canceling cyclic errors, it is only necessary to detect the optical path length difference between the reference light and test light in each of n states different by 1/n of a cyclic error cycle T detected beforehand or a light source wavelength λ to be used. Accordingly, the controller 122 need only control the driving of the second driver 121 by 1/n of the cyclic error cycle T or the light source wavelength λ to be used. The controller 122 having the function of the processor 40 calculates the driving amount based on the optical path length between the detector 72 and Z standard mirror 71z.

<Embodiment of Method of Manufacturing Article>

A method of manufacturing an article according to an embodiment of the present invention is used to manufacture an article such as a metal part or optical element. The method of manufacturing an article according to the embodiment includes a step of measuring the shape of an object using the measuring apparatus, and a step of processing the object based on the measuring result in the preceding step. For example, the shape of an object is measured using the measuring apparatus, and the object is processed (manufactured) based on the measuring result so that the shape of the object matches the design value. The method of manufacturing an article according to the embodiment can measure the shape of an object by the measuring apparatus at high accuracy, and thus is superior to a conventional method in at least one of the performance, quality, productivity, and production cost of the article.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-167960 filed on Aug. 20, 2014, and Japanese Patent Application No. 2015-105818 filed on May 25, 2015, which are hereby incorporated by reference herein in their entirety.

What is claimed is:

1. A measurement apparatus for measuring a shape of a test surface, the measurement apparatus comprising:
an optical system including a reference surface, and configured to irradiate a measurement point on the test surface and the reference surface with light, and cause test light reflected by the measurement point and reference light reflected by the reference surface to interfere with each other;
a detector configured to detect an optical path length difference between the test light and the reference light using interfering light of the test light and the reference light; and
a processor configured to determine a position of the measurement point,
wherein a detection result from the detector includes an error, which cyclically changes in accordance with a change of the optical path length difference,
wherein the detector obtains n detection results by detecting the optical path length difference in each of n states where the distances between the optical system and the measurement point obtained from the n states are different from each other by 1/n of a cycle of the error, where n is an integer greater than one, and
wherein the processor determines, based on the n detection results, the position of the measurement point by performing a calculation to reduce a total of the cyclic errors of the n detection results to zero based on the following expressions:

$CE1+CE2=0;$ $M1=L_0+CE1;$ $M2=(L_0+T/2)+CE2;$ $M1+M2=(2L_0+T/2)+(CE1+CE2);$ and $L_0=\{(M1+M2)-T/2\}/2,$ where $L_0$ represents the distance in a first state, CE1 represents a cyclic error in the first state, CE2 represents a cyclic error in a second state where the distance is different from the first state, phases of the cyclic errors CE1 and CE2 being different by π, T represents a specific cycle, M1 represents the detection result in the first state, and M2 presents the detection result in the second state.

2. The apparatus according to claim 1, wherein the processor determines the cycle based on a relationship between a change amount of the optical path length of the test light and a change amount of the optical path length difference detected by the detector.

3. The apparatus according to claim 1, wherein:
the processor obtains respective positions of a plurality of measurement points on the test surface by obtaining the plurality of detection results with respect to the plurality of measurement points on the test surface, and determines the shape of the test surface based on the respective positions of the plurality of measurement points on the test surface,
the apparatus further comprises a changing unit, including a driver, configured to change a relative position between the optical system and the test surface in a direction perpendicular to an optical axis of light emitted from the optical system to the test surface, the processor obtains the n detection results with respect to the plurality of measurement points on the test surface in the n states where the optical path lengths of the test light are different from each other by the 1/n of the cycle, and the processor causes the detector to detect the optical path length difference at each measurement point on the test surface while causing the changing unit to change the relative position.

4. The apparatus according to claim 3, further comprising:
a lens arranged on an optical path between the optical system and the test surface,
wherein the lens is configured so that light emitted from the optical system and light reflected by the test surface become parallel between the optical system and the lens.

5. The apparatus according to claim 3, wherein the processor controls the changing unit to change, when causing the detector to detect the optical path length difference, to change a distance between the optical system and the measurement point in accordance with the cycle.

6. The apparatus according to claim 1, wherein the n states are generated by changing the distance between the optical system and the measurement point.

7. The apparatus according to claim 1, wherein the n states are generated by changing a refractive index in a space between the optical system and the test surface.

8. The apparatus according to claim 7, further comprising:
a refractive index changing unit configured to change the refractive index in the space,
wherein the refractive index changing unit changes the refractive index in the space by changing a pressure of a gas in the space.

9. The apparatus according to claim 8, wherein the refractive index changing unit includes a pressure gauge configured to measure the pressure of the gas in the space, and changes the pressure of the gas in the space based on a measurement result by the pressure gauge.

10. The apparatus according to claim 7, further comprising:
a refractive index changing unit configured to change a refractive index in the space,
wherein the refractive index changing unit changes the refractive index in the space by changing a composition of a gas in the space.

11. The apparatus according to claim 10, wherein the refractive index changing unit changes the composition of the gas in the space by changing a mixing ratio of a plurality of types of gases.

12. A measurement apparatus for measuring a shape of a test surface, the measurement apparatus comprising:
a probe configured to contact with a measurement point on the test surface;
a detector provided on the probe and configured to irradiate a standard surface and a reference surface with light and detect interfering light of the test light reflected by the standard surface and the reference light reflected by the reference surface, and detecting an optical path length difference between test light and reference light; and
a processor configured to determine a position of the measurement point,
wherein a detection result from the detector includes an error, which cyclically changes in accordance with a change of the optical path length difference,
wherein the detector obtains n detection results by detecting the optical path length difference in each of n states where distances between the probe and the standard surface obtained from the n states are different from each other by 1/n of a cycle of the error, where n is an integer greater than one, and wherein the processor determines, based on the n detection results, the position of the measurement point by performing a calculation to reduce a total of the cyclic errors of the n detection results to zero based on the following expressions:

$CE1+CE2=0$;

$M1=L_0+CE1$;

$M2=(L_0+T/2)+CE2$;

$M1+M2=(2L_0+T/2)+(CE1+CE2)$; and $L_0=\{(M1+M2)-T/2\}/2$, where $L_0$ represents the distance in a first state, CE1 represents a cyclic error in the first state, CE2 represents a cyclic error in a second state where the distance is different from the first state, phases of the cyclic errors CE1 and CE2 being different by $\pi$, T represents a specific cycle, M1 represents the detection result in the first state, and M2 presents the detection result in the second state.

13. The apparatus according to claim 12, wherein the measurement apparatus measures the shape of the test surface by scanning the probe on the test surface in a state where the probe and the test surface are in contact each other.

14. The apparatus according to claim 12, further comprising:
a reaction force detector configured to detect a reaction force received by the probe from the test surface;
a driver configured to drive the probe; and
a controller configured to control the driver,
wherein the controller controls the driver based on a detection result by the reaction force detector so that the reaction forces are different from each other in the n states.

15. The apparatus according to claim 12, further comprising:
a reaction force detector configured to detect a reaction force received by the probe from the test surface;
a driver configured to drive the probe; and
a controller configured to control the driver,
wherein the probe is so configured that degrees of its stiffness are different from each other in the n states, and
the controller controls the driver based on a detection result by the reaction force detector so that the reaction force is constant in the n states.

16. The apparatus according to claim 12, further comprising:
a second driver configured to drive the standard surface to change a position of the standard surface in a direction parallel to an optical axis of light irradiating the standard surface by the detector; and
a controller configured to control the second driver,
wherein the controller controls the second driver to generate the n states.

17. A method of manufacturing an article, the method comprising the steps of:
measuring a shape of a test surface using a measurement apparatus; and processing the test surface based on a measurement result in the measuring step, wherein the measurement apparatus includes:

an optical system, including a reference surface, configured to irradiate a measurement point on the test surface and the reference surface with light, and cause test light reflected by the measurement point and reference light reflected by the reference surface to interfere with each other;

a detector configured to detect an optical path length difference between the test light and the reference light using interfering light of the test light and the reference light; and a processor configured to determine a position of the measurement point, wherein a detection result from the detector includes an error, which cyclically changes in accordance with a change of the optical path length difference, wherein the detector obtains n detection results by detecting the optical path length difference in each of n states where the distances between the optical system and the measurement point obtained from the n states are different from each other by 1/n of a cycle of the error, where n is an integer greater than one, and wherein the processor determines, based on the n detection results, the position of the measurement point by performing a calculation to reduce a total of the cyclic errors of the n detection results to zero based on the following expressions:

$CE1+CE2=0;$ $M1=L_0+CE1;$ $M2=(L_0+T/2)+CE2;$ $M1+M2=(2L_0+T/2)+(CE1+CE2);$ and $L_0=\{(M1+M2)-T/2\}/2,$ where $L_0$ represents the distance in a first state, CE1 represents a cyclic error in the first state, CE2 represents a cyclic error in a second state where the distance is different from the first state, phases of the cyclic errors CE1 and CE2 being different by $\pi$, T represents a specific cycle, M1 represents the detection result in the first state, and M2 presents the detection result in the second state.

18. A measurement method for measuring a shape of a test surface using a measurement apparatus including an optical system, including a reference surface, configured to irradiate a measurement point on the test surface and the reference surface with light, and cause test light reflected by the measurement point and reference light reflected by the reference surface to interfere with each other, the method comprising the steps of:

detecting an optical path length difference between the test light and the reference light using interfering light of the test light and the reference light; and determining a position of the measurement point, wherein a detection result from the detection step includes an error, which cyclically changes in accordance with a change of the optical path length difference, wherein the detecting step obtains n detection results by detecting the optical path length difference in each of n states where the distances between the optical system and the measurement point obtained from the n states are different from each other by 1/n of a cycle of the error, where n is an integer greater than one, and wherein the determining step determines, based on the n detection results, the position of the measurement point by performing a calculation to reduce a total of the cyclic errors of the n detection results to zero based on the following expressions:

$CE1+CE2=0;$ $M1=L_0+CE1;$ $M2=(L_0+T/2)+CE2;$ $M1+M2=(2L_0+T/2)+(CE1+CE2);$ and $L_0=\{(M1+M2)-T/2\}/2,$ where $L_0$ represents the distance in a first state, CE1 represents a cyclic error in the first state, CE2 represents a cyclic error in a second state where the distance is different from the first state, phases of the cyclic errors CE1 and CE2 being different by $\pi$, T represents a specific cycle, M1 represents the detection result in the first state, and M2 presents the detection result in the second state.

* * * * *